US012725476B2

(12) United States Patent
Johnson et al.

(10) Patent No.: US 12,725,476 B2
(45) Date of Patent: *Sep. 1, 2026

(54) SYSTEM, METHOD AND APPARATUS FOR MULTI-VENDOR ROLLING CODE KEYLESS ENTRY AND FOR IDENTIFYING AND STORING KEY INFORMATION AND CREATING DUPLICATE KEYS AND REMOTE ENTRY DEVICES

(71) Applicant: iKeyless, LLC, Louisville, KY (US)

(72) Inventors: Daniel Charles Johnson, Crestwood, KY (US); Daniel Patrick Bowen, Mountain View, CA (US); Michael Calvin McCoy, Palo Alto, CA (US); Dave King, Shelbyville, KY (US)

(73) Assignee: IKEYLESS, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,571

(22) Filed: Sep. 13, 2021

(65) Prior Publication Data

US 2022/0139137 A1 May 5, 2022

Related U.S. Application Data

(63) Continuation-in-part of application No. 16/780,805, filed on Feb. 3, 2020, now Pat. No. 11,120,654, and (Continued)

(51) Int. Cl.

*G07C 9/00* (2020.01)
*B60R 25/24* (2013.01)

(52) U.S. Cl.

CPC .......... *G07C 9/00857* (2013.01); *B60R 25/24* (2013.01); *G07C 2009/00492* (2013.01)

(58) Field of Classification Search

CPC ...... G07C 9/00857; G07C 2009/00492; B60R 25/24

(Continued)

(56) References Cited

U.S. PATENT DOCUMENTS 5,046,093 A 9/1991 Wachob
5,864,297 A 1/1999 Sollestre et al.

(Continued)

OTHER PUBLICATIONS

Keyless Ride, LLC, K2 Forge User Manual, "K2 Forge Universal Automobile Remotes OEM-Compatible Dual Vehicle", http://www.keylessride.com/images/marketing/k2_v2.pdf, accessed Jan. 28, 2014.

*Primary Examiner* — Zhen Y Wu
(74) *Attorney, Agent, or Firm* — Gray Ice Higdon

(57) ABSTRACT

A system providing rolling code remote device functions to provide keyless entry to multiple makes and models of cars. The system adapted to produce the radio signal type and transmitted data of an original manufacturer's keyless entry remote device system by implementing multiple modulation schema and data encoding techniques. A system for backing up and restoring or replacing OEM vehicle keys. The system stores a copy of data from an OEM key along with other information necessary to replace the OEM key in a key bank. The data collected is processed and stored, a customer can order a universal replacement from the key bank programmed with stored data to emulate prior paired OEM key.

20 Claims, 19 Drawing Sheets

Related U.S. Application Data a continuation-in-part of application No. 16/153,602, filed on Oct. 5, 2018, now Pat. No. 11,127,230, said application No. 16/780,805 is a continuation of application No. 16/153,573, filed on Oct. 5, 2018, now Pat. No. 10,553,060, which is a continuation of application No. 14/165,922, filed on Jan. 28, 2014, now Pat. No. 10,115,255.

(60) Provisional application No. 62/695,620, filed on Jul. 9, 2018, provisional application No. 61/850,014, filed on Feb. 7, 2013.

(58) Field of Classification Search
USPC .......................................................... 340/5.25
See application file for complete search history.

(56) References Cited

U.S. PATENT DOCUMENTS 5,886,421 A * 3/1999 Mizuno .............. G07C 9/00309 180/287
5,926,103 A 7/1999 Petite
6,127,740 A * 10/2000 Roddy .................. B60R 25/406 307/139
6,304,139 B1 * 10/2001 Kanno .................. H04W 52/52 330/133
6,333,698 B1 * 12/2001 Roddy ................... G08C 19/28 455/107
6,801,967 B2 10/2004 Nakamura et al.
6,870,458 B2 * 3/2005 Caren ................ G07C 9/00817 340/426.36
6,998,956 B2 2/2006 Dix
7,124,058 B2 10/2006 Namaky et al.
7,411,417 B1 * 8/2008 Rutledge .......... H03K 19/17764 326/38
8,466,774 B2 6/2013 Lopez et al.
2003/0112121 A1 6/2003 Wilson
2004/0066308 A1 4/2004 Sampsell
2004/0113753 A1 * 6/2004 Chen ....................... B60R 25/24 340/5.7
2004/0155793 A1 8/2004 Mui
2004/0252030 A1 12/2004 Trimble et al.
2005/0146418 A1 * 7/2005 Caren ................ G07C 9/00857 340/5.2
2005/0212655 A1 9/2005 Underdahl
2005/0225429 A1 10/2005 Burzio
2005/0231323 A1 10/2005 Underdahl et al.
2005/0248436 A1 11/2005 Hohmann et al.
2005/0285724 A1 * 12/2005 Schmidt ................ B60R 25/246 340/426.2
2006/0176146 A1 8/2006 Krishan et al.
2007/0001805 A1 * 1/2007 Utter ....................... B60R 25/24 340/5.72
2007/0008168 A1 1/2007 Ciao et al.
2007/0096938 A1 5/2007 Lopez et al.
2007/0096940 A1 5/2007 Laranang et al.
2007/0120641 A1 5/2007 Sommer et al.
2007/0229301 A1 10/2007 Katz
2007/0279184 A1 * 12/2007 Desai ................. G07C 9/00182 340/426.36
2008/0061929 A1 * 3/2008 Cromer ............. G07C 9/00309 340/5.63
2008/0150685 A1 6/2008 Desai et al.
2009/0029659 A1 * 1/2009 Gonzalez ............. H04B 1/1607 455/127.1
2009/0096596 A1 * 4/2009 Sultan ................ G07C 9/00309 340/426.13
2009/0113963 A1 5/2009 Pocrass
2009/0160607 A1 * 6/2009 Edwards ................. B60R 25/24 340/5.61
2009/0243796 A1 * 10/2009 Tieman ................. B60R 25/406 340/5.72
2009/0278656 A1 * 11/2009 Lopez .................... G08C 17/02 340/5.72
2010/0182157 A1 * 7/2010 Shaffer .................... H04Q 9/00 340/636.13
2011/0086668 A1 * 4/2011 Patel ................... F02N 11/0807 340/5.72
2013/0063243 A1 * 3/2013 Witkowski ............. G05B 11/01 340/5.7
2013/0069761 A1 * 3/2013 Tieman .............. G07C 9/00309 340/5.64
2013/0278381 A1 * 10/2013 Lopez .................... G08C 17/02 340/5.61
2021/0035390 A1 * 2/2021 Determann ........ G07C 9/00857

* cited by examiner

400

500

600

700

800

900

2602 Receive customer service request

2604 Confirm customer identity and vehicle

2606 Cut URHK blade

2608 Program URHK to proper vehicle SKU

2610 Emulate transponder

2612 Update memory with critical OEM key parameters

2614 Program and enable any iKeyless specific key features

2616 Ship or deliver by iKeyless van

2617 Activate key via smartphone/tablet

2618 Send customer service report

2620 Invoice customer

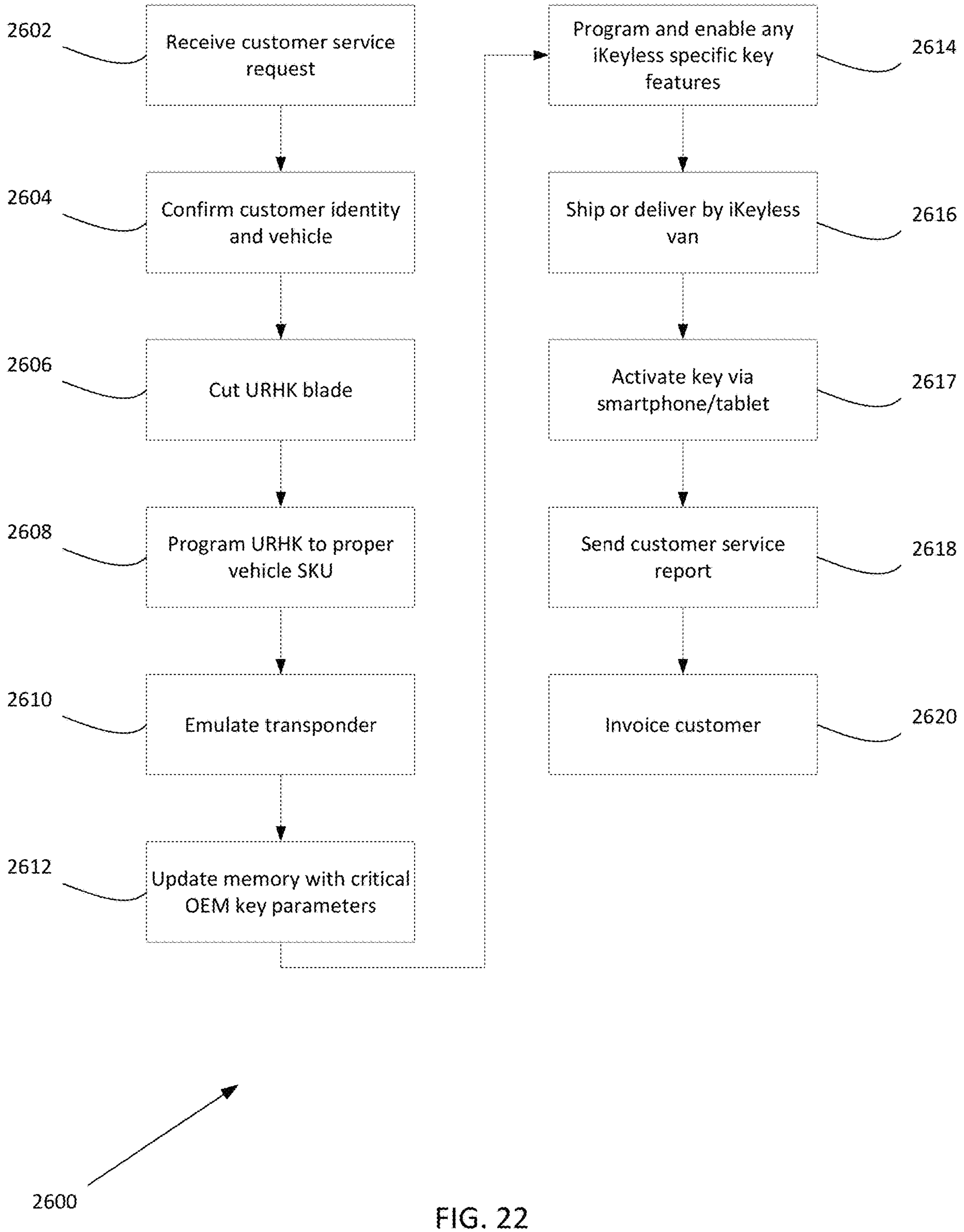

FIG. 22

SYSTEM, METHOD AND APPARATUS FOR MULTI-VENDOR ROLLING CODE KEYLESS ENTRY AND FOR IDENTIFYING AND STORING KEY INFORMATION AND CREATING DUPLICATE KEYS AND REMOTE ENTRY DEVICES

CROSS REFERENCE TO RELATED APPLICATIONS

The present application claims benefit of priority to and is a continuation-in-part of U.S. patent application Ser. No. 16/780,805, filed Feb. 3, 2020, and entitled METHOD AND APPARATUS FOR IMPLEMENTING MULTI-VENDOR ROLLING CODE KEYLESS ENTRY SYSTEMS (Johnson et al.), which issues as U.S. Pat. No. 11,120,654 on Sep. 14, 2021, which claims benefit of priority to and is a continuation of U.S. patent application Ser. No. 16/153,573, filed Oct. 5, 2018, and entitled METHOD AND APPARATUS FOR IMPLEMENTING MULTI-VENDOR ROLLING CODE KEYLESS ENTRY SYSTEMS (Johnson et al.), which issued as U.S. Pat. No. 10,553,060 on Feb. 4, 2020, which claims benefit of priority to and is a continuation of U.S. patent application Ser. No. 14/165,922, filed Jan. 28, 2014, and entitled METHOD AND APPARATUS FOR IMPLEMENTING MULTI-VENDOR ROLLING CODE KEYLESS ENTRY SYSTEMS (Johnson et al.), which issued as U.S. Pat. No. 10,115,255 on Oct. 30, 2018, which claims benefit of priority to U.S. Provisional Pat. Application Ser. No. 61/850,014, filed Feb. 2, 2013, and entitled METHOD AND APPARATUS FOR IMPLEMENTING MULTI-VENDOR ROLLING CODE KEYLESS ENTRY SYSTEMS (Bowen et al.), each of which are hereby incorporated by reference herein in their entirety.

The present application claims benefit of priority to and is a continuation-in-part of U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which issues as U.S. Pat. No. 11,127,230 on Sep. 14, 2021, which claims benefit of priority to U.S. Provisional Pat. Application Ser. No. 62/695,620, filed Jul. 9, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), each of which is hereby incorporated by reference herein in its entirety.

FIELD OF INVENTION

A first "URHK" aspect of invention generally relates to a radio frequency ("RF") device adapted to provide keyless entry capability to multiple makes and models of vehicles by replicating both the RF frequency and data transmitted by a manufacturer's original equipment ("OEM") keyless entry remote device. The first aspect of invention may relate to use of multiple modulation schemes and data encoding techniques to enable the full functionality available with an OEM keyless entry remote device. The first aspect of invention may be loaded with data stored in vendor specific profiles to implement specific transmit frequencies, modulation schemes, binary encoding algorithms, packet payload templates, and algorithms that are used to generate the rolling codes needed to replicate the function of an OEM keyless entry remote device.

A second "Key Bank" aspect of invention generally relates to the field of replicating or copying keys. More specifically, the present invention relates to storing a copy of information relating to unique and/or encrypted data related to a vehicle key and for creating a copy of the vehicle key using the stored information such that the duplicate key can be used on a vehicle without the use of a locksmith or other specialized technician. The second aspect of invention identifies and stores unique information associated with a vehicle key including information relating to encryption codes and transponder information in a central server and uses the stored information to create an exact copy of the vehicle key.

BACKGROUND OF THE INVENTION

Remote Access systems for consumer vehicles have become a popular, if not essential, feature of most vehicles sold today. Nearly every vehicle on the market for the past several years has included some form of keyless entry as either a standard feature or add-on option. Consumers with older vehicles without remote access systems have been able to retrofit their vehicles with aftermarket systems.

The technologies behind these systems have evolved rapidly with remote systems moving from low security fixed codes with simple transmission schemes to high security encrypted rolling codes with advanced transmission protocols. Developers of these systems, both OEM and aftermarket, have been constantly refining and improving their offerings to take advantage of improvements in technology. Over time, the numerous designs and platforms, coupled with rapidly changing security technologies, have resulted in a great variety of remote devices and systems that are almost universally incompatible across vehicle brands or makes and even between different year and models of vehicles. Several problems exist with currently available OEM keyless entry remote devices.

First, retailers and resellers of vehicle remote devices must stock a large number of remote device stock keeping units ("SKU") to cover the breadth of vehicle makes, models, and years. Vehicle manufacturers may have a diverse range of remote devices among their models or they may be homogeneous in general but vary in small cosmetic changes like buttons or model labeling. This problem is compounded by the fact that many remote devices have very similar appearance but are not functionally interchangeable for a given car model or year. Resellers must maintain detailed compatibility databases and cope with end user confusion about which remote device can be paired with their car.

Second, replacement remote devices for those lost or damaged are typically proprietary and very expensive and available from the original manufacturer only for a limited number of years after the manufacturer stops production of the particular vehicle model. Once this window closes it may become increasingly difficult for consumers to buy a new OEM remote device.

Third, many consumers own more than one vehicle and each vehicle may be a different make or model and may have its own keyless entry remote device that is not compatible with the other vehicles owned by the consumer. Managing two or more remote devices can be a nuisance and confusing if the remote devices feel or look similar but are incompatible.

Finally, the features and capabilities of a given OEM or aftermarket remote device are limited by the technologies of period it was produced. Many remote devices were designed with poor analog transmitters that lacked range or battery life. These remote devices may have used fixed or simple rolling codes in their protocol that limit their security margin.

Another challenge with OEM remote devices is that there are no enforced standards for implementing rolling code locking systems and remote devices. Remote keyless entry systems known in the art employ a wide range of schemes for generating the key sequences used by remote devices. There are several common data formats used in remote device RF radio transmissions and each type is typically referred to as a code. These code types include fixed codes, rolling codes, and encrypted rolling codes.

The first generation of keyless entry remote devices transmitted the same data pattern every time a key was pressed. This is referred to as a "fixed code." The data is simple, and usually consists of an ID code and function code. For example, a fixed code remote device would generate a signal by combining an ID code of 01010 and a function code of 111, which when put together is sent or transmitted as 01010111. Other keys on the remote device might have function codes of 000, 001, 011, etc., but the ID code would be the same for each key, ex: 01010000. Most fixed code remote devices have a different ID code, but all units of a particular remote device model shared the same function codes. Increasingly, over time this type of code could easily be intercepted by an unauthorized person and replayed through a transmitter to gain unauthorized access to the vehicle.

To eliminate the replay vulnerability of fixed codes, the ID code was made longer, and made to change in a predefined number sequence every time a button was pressed, this is known as a "rolling code". The ID number sequence was known to the remote device, and the car receiver. They merely had to be synchronized to the same point in the sequence, and the car would always know what code should come next in sequence from the remote device. However, this sequence is not a pre-stored list of numbers. The next number is generated by a mathematical formula that produces a known sequence of what appears to be random numbers. This approach provides a much greater level of security, as an attacker must exactly replicate the mathematical algorithm used to generate the numbers. The difficulty in recreating the original algorithm is easily increased by making the ID code longer, but this too can be subject to a replay attack.

An encrypted rolling code remote device encrypts the signal generated by the rolling code system before radio transmission, making it more difficult for an unauthorized person to analyze the rolling code content. Encryption schemes vary from vendor to vendor and usually include longer key sequences and specialized hardware to generate the encrypted key sequences. Keeping in mind that rolling code remote devices also increment their key sequences, many vendors also use elaborate algorithms to determine the amount by which the key sequence number will be incremented. Additionally, complex authentication schemes can be used between the remote device, the user's physical transponder key, and the RF base station in the vehicle to validate the key that was provided by remote device.

The use of multiple code schemes in the art makes it very challenging to create a device that is compatible with multiple makes and models of vehicle or with multiple remote devices. Furthermore, remote devices known in the art are typically frequency fixed. Frequency fixed remote devices cannot be reprogrammed to work optimally or at all at different transmission frequencies.

What is needed is a programmable and reconfigurable keyless entry remote device that solves the availability, security, and technical problems of existing OEM keyless entry remote devices.

In addition, Contemporary remote keyless entry systems are designed to be easy to use and secure from attackers. When a user presses a button on his or her keyless remote, an internal microprocessor interprets the request and generates a unique packet of binary data. This packet may contain a unique serial number of the remote, an authentication string, function code, and various checksums. This data packet is then transmitted by the remote via an ultra high frequency radio signal to the vehicle. The user's vehicle can then process the data verifying the remote is authorized and perform the requested action (ex: unlocking a door).

The transmitted radio signal could be monitored by possible attackers so the authentication string is important in maintaining the security of the vehicle. The authentication string often changes with each button press in what is known as a "rolling code". This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Additionally, Starting in the early 1990s, car keys began incorporating transponder technology. Transponders are small plastic or glass inserts that are self-contained devices which supplemented the security of the cut key blade. Transponders require no battery and are powered by a low frequency radio signal delivered from a loop of wire around the ignition coil. When a driver starts his or her car, the key blade activates the ignition and the car simultaneously "reads" the transponder via the wire loop to verify the key was authorized to start the car. If the transponder does not "respond" with a valid code (e.g., in the case of hot-wiring a car), the car will shut itself off after a few seconds from starting.

Security transponder evolution has mirrored that of remote keyless entry systems with the first generation being simple, insecure devices that transmitted a fixed value when interrogated by the ignition coil. Much like remote keyless entry, the communication signals can be easily monitored by an attacker with legally available tools. To avoid replay attacks, transponders quickly moved to more complex encryption, such as HITAG and AES, as well as the use of rolling codes. Transponders are now typically highly secure devices capable of bidirectional communication with the vehicle. With the ability for the car to send data to a transponder, some vehicle keys have the ability to store hundreds of bytes of information about the key and vehicle. This information may comprise secret encryption keys and comfort features such as the last radio station used or electronic seat position.

In addition to incorporating transponders with the key blade, remote keyless entry ("RKE") systems and key fobs now incorporate the transponder functionality with remote keyless entry microprocessors on the key blade. The combination of transponder, remote keyless entry microprocessor and system, and key blade forms a combination key where the keyless remote, key blade, and security transponder are packed together into a single device. These devices are both cheaper to produce than keys and remotes and are more secure. The remote keyless entry portion and transponder portion of the key can share information providing for the transponder to receive rolling code and encryption key updates from the vehicle. Using a combination key with the transponder and remote keyless entry system in communication with one another, the rolling code protocols and encryption techniques may become very advanced and unbreakable to all but the most dedicated attacker.

Due to this high margin of security, these devices are not something the lay person could replace or add to their vehicle easily. To pair such a "combo" key to a car requires both a locksmith to cut the blade and specialized programming tools, unavailable to the public, to pair the transponder and remote with the vehicle. Often the vehicle dealer is the only source for keys and pairing tools which leads to high prices for replacement keys/remotes.

Given the complexity of the RKE systems in vehicles, automotive key/remote duplication is a complex and expensive process. Car owners may have a difficult time finding replacement keys and remotes, especially for older vehicles that may no longer be supported by the original manufacturer or automotive dealership.

Once a vehicle owner has located a source for a new RKE device, they must purchase the device and then pay for a locksmith to "pair" the product to the vehicle. This "pairing" process usually involves the use of an expensive dealer owned programming tool or an aftermarket programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key or remote with the vehicle. Once generated, these authentication codes are static. If the authentication codes were captured during the pairing process, they would remain valid for later usage. Generally, this conversation between the tool and the vehicle includes a security transponder, the vehicle electronic control unit ("ECU") or body control module ("BCM"), and the RKE device. If this process is not executed properly or a programming fault occurs it is possible to leave the car in a "bricked" state where the vehicle will not start or respond properly to the RKE device. It can be a very expensive process to reset the ECU or body control module of a vehicle.

The problem described above can become even more complicated if the vehicle owner loses their RKE device while traveling to locations where they do not have access to a dealership that can support their vehicle. In this instance, the vehicle owner may be faced with significant towing charges and delays while they wait to have their vehicle key replaced by an authorized dealer. These are only the basic challenges associated with replacing keys and remotes. The key generation and replacement problem is even more complex when viewed from a locksmith perspective.

A wide range of tools and software is required to pair a RKE device to a vehicle. A typical suite of tools may include a very expensive programming tool, software modules to cover various vehicle brands and model years, and a separate OBD port module that performs all or part of the pairing process. Tooling and software costs alone can easily exceed $20,000 if the locksmith wants to service a broad range of vehicles.

In addition to the programming tools and software, locksmiths must provide key blades that come in many types and shapes depending on the manufacturer's requirements for the ignition cylinder. Modern blades are typically milled as opposed to traditional grinding wheel approaches. These special cutting tools are also very expensive.

Once the blade issues are addressed, the locksmith may also be required to purchase PIN codes and wait long periods of time to activate the PIN codes during the pairing process. To recover labor and equipment costs locksmiths typically charge their customers significant fees for their services.

From a customer perspective, other issues may occur that may cause the pairing process to become even more complex. In many cases, when performing the pairing process, the customer must have all their keys and remotes available for the locksmith at the time a key is to be paired to the vehicle. The maximum number of keys that can be paired varies between vehicle makes and models but is normally between 4-6 keys. Some vehicles have "master" and "valet" keys. Valet keys cannot normally be used when pairing new keys to the vehicle so, if the master keys have been lost, a new master key must be first be made. Additionally, some customers may need to have their keys or remotes paired to the vehicle again after a vehicle service or repair if the battery was removed from the vehicle for an extended period.

These issues compound to make for a very challenging and negative experience for the customer when replacing or copying an OEM vehicle key. Customers are forced to source replacement keys from dealers or locksmiths.

One possible solution to some of these issues is the use of a "virtual key" hosted entirely on a smartphone. Many virtual key devices bypass traditional immobilizers and security systems. Some even communicate directly with the BCM or ECU. These approaches may be dependent on networks that lack appropriate levels of security thereby putting the vehicle at risk. Additionally, car companies are constantly designing new systems that are unique to their vehicles and do not rely on traditional RKE solutions. In these cases, the customer is forced to purchase expensive replacement keys/remotes directly from the OEM supplier or dealerships. Smart phone related solutions also rely on phone apps and hardware that may have failure modes due to limited network access at critical times. Battery limitations may also be an issue for smartphone hosted virtual keys.

What is needed is a system for storing OEM key information such that a customer can order a replacement OEM key without having to pair the key with the vehicle. What is needed is a service that ensures that a customer can obtain a new key or remote for their vehicle without the burden of locating a replacement product, locating a suitable locksmith, and scheduling a time to have the product paired with the vehicle.

SUMMARY OF THE INVENTION

While the various inventions may be referred to as "present invention" the term is not limiting or requiring all aspects of invention disclosed herein. Although the first (URHK) and second (Key Bank) inventive aspects are related and combinable, the individual inventive features may stand on their own as inventions.

Relating primarily to the URHK inventive aspect, the present invention provides in one embodiment, a device that is capable of providing rolling code remote device functions to provide keyless entry to multiple makes and models of cars. This type of device may also be used in other RF locking applications such as garage door openers, industrial controls, sensor systems, and other remote control applications. For the purpose of simplifying the discussion the present invention principally describes an embodiment of the invention as a device used in automobile remote device keyless entry systems. However, the present invention may also be used in a broad range of rolling code lock related applications.

The URHK inventive aspect of the present invention recreates, with exact precision, the radio signal type and transmitted data of the OEM remote device that was originally provided with a vehicle. To do so, the present invention implements multiple modulation schemes and data encoding techniques. The binary information (data) that is transmitted through the radio signal is the primary concern in replicating the radio signal type and transmitted data of an OEM remote device. The binary data forms a data packet that contains headers, button IDs, checksums, and other device information which includes a key sequence. The key sequence is typically generated using various encryption algorithms. In a rolling code remote device, this key sequence is numerically incremented based on a vendor specific algorithm each time a button on the remote device is activated. This data is verified, synchronized, and authenticated by a base station unit in the vehicle when the remote device is used to lock or unlock the vehicle.

The URHK inventive aspect of the present invention is unique in that it can provide interoperability with rolling code remote devices from multiple manufacturers. To provide this functionality the present invention stores vendor-specific profiles that allow the present invention to implement specific transmit frequencies, modulation schemes, binary encoding algorithms, packet payload templates, and the algorithm that is used to generate the necessary rolling code. Procedures used to program remote devices also vary widely from vendor to vendor. In order to address the required programming modes, the present invention may include hardware interfaces for infra-red ("IR") sensors/receivers, high frequency RF transmitters/receivers (300 MHz-900 MHz), and low frequency RF receivers. The programming sequence required to program the device will also be stored in memory using the previously mentioned vendor profiles. The present invention also includes a discussion of various systems that could be used to program these devices for the end user.

The URHK inventive aspect of the present invention creates a single remote device that can be configured to emulate a large portion of the available remote devices and be as broadly compatible as possible. One embodiment of the present invention provides a method and apparatus for implementing multi-vendor rolling code lock systems that make use of vendor profiles to ensure that the resulting products are compatible and interoperable with the original OEM product. This embodiment may be used for automobile remote device keyless entry systems but the principles and techniques described herein may be applied to many other products where a secure locking system is required.

The URHK inventive aspect of the present invention makes use of a novel collection of circuit functions to allow for a wide range of programmability and customization. In one embodiment, a unique transceiver architecture allows the device to simultaneously transmit and receive on multiple channels via infra-red, high frequency RF, and low frequency RF interfaces. These features may be enabled or disabled via a configuration interface. The general input/output ("I/O") interface in this embodiment may also be used to include temperature/motion sensors, GPS capabilities, vibration modes, audio sensing, and gyroscopic/orientation information.

For applications where sufficient power is available, the device described in the present invention may also support communication channels which utilize Bluetooth and 802.11 wireless technologies. The broad range of interfaces and transmission means provide for the implementation of customized remote devices for non-traditional applications of keyless entry systems such as industrial automation, wireless security systems, and control of wireless sensor arrays. In addition, Bluetooth and 802.11 wireless interfaces would allow the device to be controlled via mobile phones that support these wireless technologies.

Furthermore, the URHK inventive aspect of the present invention solves many of the problems described hereinabove by providing a single keyless entry remote device unit that can be configured to operate alternatively as a variety of remote devices types. The present invention is both less expensive and less confusing for a reseller or car dealer to stock, i.e., a single remote device product or much reduced inventory of remote device products, and reduces the need to maintain a cumbersome compatibility database. The present invention reduces the need for original OEM parts by emulating the functionality provided by the OEM part. In addition, as the present invention is configurable and reconfigurable, a remote device for a particular vehicle will always be available as long as the device and method described in the present invention are available. The present invention also alleviates problems caused by owning multiple vehicles that require individual OEM keyless entry remote devices as it can emulate the functionality of two or more remote devices simultaneously, thereby allowing the consumer to only have to carry a single remote device for all their vehicles. A button may be provided in the remote device to select between vehicles for operation. Furthermore, the present invention improves on existing OEM keyless entry remote device designs by changing the existing basic protocol to a newer, more efficient, software based, digital transmitter platform that improves transmit range and/or battery life compared to the original remote device. Security is also moderately improved through additional obfuscations added to remote device protocols making the protocols harder to clone when received from the present invention. In addition, many advanced convenience features such as motion control or passive entry may be added to remote device systems that never had those features.

In one embodiment, a method and apparatus for creating a single rolling code remote that may be configured to work with multiple makes/models of cars and is fully interoperable with OEM Remote Keyless Entry systems is provided. The method may further comprise implementing a wide range of frequencies, modulation schemes, data payloads, and encryption schemes that are programmed based on vendor profiles that are stored in the device. The apparatus may provide for the altering of the appearance of any external buttons or controls (temporarily or permanently) by a user to better reflect the configured functionality for a vehicle or end device. The method and apparatus may further comprise a keyless entry remote adapted to operate with or control one or more vehicles simultaneously without any user intervention or reconfiguration. The method and apparatus may be further adapted to, for applicable OEM and aftermarket remotes, include additional transmission data to obscure weak or less secure fixed or rolling code protocols. The method may comprise appending dummy data to increase the overall security margin of the remote device by making the target data on the remote device more difficult to reverse engineer or clone. The method and apparatus may further comprise modifying the remote device's configuration data set via an external "configuration tool". The configuration tool may also provide a user with button and function matching utilities to map buttons and functions to the remote device's possible inputs. The method and apparatus may further comprise generating secure pseudo-random sequences for use as unique serial numbers, encryption keys and/or rolling code seeds. The method and apparatus may further comprise a global positioning system ("GPS") services to provide location, time, and motion related information to a user. The method and apparatus may further comprise dynamic antenna shaping via passive and active circuit elements. The method and apparatus may further comprise monitoring the battery condition to adjust RF transmit power based on a detected internal battery voltage.

In another embodiment, a method for selectively programming an RF remote access device is provided. The method may comprise: selecting a set of device configuration profiles from a plurality of device configuration profiles; storing in a memory of the remote access device the selected set of device configuration profiles; and automatically configuring the remote access device based on the selected set of device configuration profiles, whereby the remote access device is configured to: generate an RF signal based on the selected set of device configuration profiles; and transmit the RF signal to an end device associated with the selected set of device configuration profiles to cause the end device to perform a predefined operation.

The embodiment may further comprise the following. The plurality of device configuration profiles may comprise a set of original equipment manufacturer ("OEM") configurations for specific vehicle makes and models. The storing may further comprise storing the set of device configuration profiles by an active learning configuration module, storing the set of device configuration profiles from an other remote access device, manually inputting the set of device configuration profiles. The method may further comprise: selecting the set of device configuration profiles from a plurality of device configuration profiles on a configuration tool; and receiving the set of device configuration profiles from a configuration tool for storing on the RF remote access device. The storing the set of device configuration profiles may comprise receiving the configuration by communication means selected from: a radio frequency communication, an inductive link communication, an infra-red communication, a visible light communication, an ultra-sonic communication, a USB communication, a serial peripheral data communication, an inter-integrated circuit bus communication, and an iWire data communication. The RF signal may be generated based on the selected set of device configuration profiles and an encryption code, and the encryption code may be a rolling code. The remote access device may be configured to transmit by a means selected from the group consisting of: a radio frequency transmission, a Bluetooth transmission, an infra-red transmission, a visible light transmission, and an 802.11 wireless transmission. The method may further comprise: storing a first set of device configuration profiles and a second set of device configuration profiles; and selecting the first set of device configuration profiles, whereby the remote access device is configured to: generate an RF signal based on the selected first set of device configuration profiles; and transmit the RF signal based on the selected first set of device configuration profiles to an end device associated with the selected first set of device configuration profiles to cause the end device to perform a predefined operation. The method may further comprise: selecting the second set of device configuration profiles, whereby the remote access device is configured to: generate an RF signal based on the selected second set of device configuration profiles; and transmit the RF signal based on the selected second set of device configuration profiles to an end device associated with the selected first set of device configuration profiles to cause the end device to perform a predefined operation. The method may further comprise automatically configuring a power state of the remote access device based on a first voltage. The method may further comprise encrypting the stored set of device configuration profiles by the remote access device. The remote access device may be further configured to automatically store location information when transmitting the RF signal. The end device may be an automobile and the RF signal causes the automobile to perform one or more of a locking/unlocking function, an engine ignition enable function, a trunk opening function, a remote device recognition, and an alarm function, and the set of device configuration profiles may include a first configuration profile associated with a first automobile and a second configuration profile associated with a second automobile, the remote access device adapted to be configured to generate and transmit a first RF signal to cause the first automobile to perform a predefined operation and to generate and transmit a second RF signal to cause the second automobile to perform a predefined operation, the first RF signal being different that the second RF signal. The set of device configuration profiles may include information derived from one or more of the following vendor-specific properties: transmit and/or receive frequencies, modulation schemes, binary encoding algorithms, data encoding techniques, packet payload templates, and algorithms configured to generate rolling codes to replicate the function of an OEM keyless entry remote device.

In yet another embodiment, a system for selectively programming an RF remote access device is provided. The system may comprise: a reprogrammable RF remote access device comprising a processor, a memory, and a transmitter; and an external device having a configuration memory comprising a plurality of sets of device configuration profiles and a configuration transmitter; whereby: the external device is adapted to transmit by the configuration transmitter a selected set of device configuration profiles to the remote access device; the memory is adapted to store the set of device configuration profiles from the configuration transmitter; the processor is adapted to access the set of device configuration profiles stored in the memory and generate an RF signal based on the set of device configuration profiles; and the transmitter is adapted to transmit the RF signal to an end device associated with the set of device configuration profiles to cause the end device to perform a predefined operation.

The system according to this embodiment may further comprise: wherein the plurality of sets of device configuration profiles may comprise a set of original equipment manufacturer ("OEM") configurations for specific vehicle makes and models; wherein the RF remote access device may further comprise an active learning configuration module; wherein the RF remote access device may comprise a manual input; and wherein the external device may be a remote configuration tool. The RF remote access device may be adapted to receive the set of device configuration profiles by communication means selected from: a radio frequency communication, an inductive link communication, an infra-red communication, a visible light communication, an ultrasonic communication, a USB communication, a serial peripheral data communication, an inter-integrated circuit bus communication, and an iWire data communication. The RF remote access device may further comprise an encryption module, and the processor may be further adapted to: retrieve an encryption code from the encryption module, the encryption code associated with the selected set of device configuration profiles; and generate the RF signal based on the set of device configuration profiles and the encryption code. The encryption code may be a rolling code. The transmitter may be adapted to transmit the RF signal by a means selected from the group consisting of: a radio frequency transmission, a Bluetooth transmission, an infra-red transmission, a visible light transmission, and an 802.11 wireless transmission. The RF remote access device may further comprise a selection means, and wherein the memory is adapted to store a first set of device configuration profiles and a second set of device configuration profiles, and the RF remote access device may be further adapted to: receive from the selection means an active set of device configuration profiles selected from the first set of device configuration profiles and the second set of device configuration profiles; generate by the processor a RF signal based on the active set of device configuration profiles; and transmit by the transmitter the RF signal based on the active set of device configuration profiles to a device associated with the active set of device configuration profiles to cause the end device to perform a predefined operation. The RF remote access device may further comprise a power state controller adapted to set a power state of the RF remote access device automatically based on a first detected voltage, an encryption module for encrypting the selected set of device configuration profiles, or a location determination means. The end device may be an automobile and the RF signal causes the automobile to perform one or more of a locking/unlocking function, an engine ignition enable function, a trunk opening function, a remote device recognition, and an alarm function. The set of device configuration profiles may include a first configuration profile associated with a first automobile and a second configuration profile associated with a second automobile, the remote access device adapted to be configured to generate and transmit a first RF signal to cause the first automobile to perform a predefined operation and to generate and transmit a second RF signal to cause the second automobile to perform a predefined operation, the first RF signal being different that the second RF signal. The set of device configuration profiles may include information derived from one or more of the following vendor-specific properties: transmit and/or receive frequencies, modulation schemes, binary encoding algorithms, data encoding techniques, packet payload templates, and algorithms configured to generate rolling codes to replicate the function of an OEM keyless entry remote device.

The system may be further characterized in one or more of the following manners: wherein the RF remote access device has stored thereon a first set of device configuration profiles and a second set of device configuration profiles, and wherein the RF remote access device is further adapted to: determine an active set of device configuration profiles selected from the first set of device configuration profiles and the second set of device configuration profiles; generate by the RF remote access device processor an RF signal based on the active set of device configuration profiles; and transmit by the RF remote access device transmitter the RF signal based on the active set of device configuration profiles to a device associated with the active set of device configuration profiles to cause the end device to perform a predefined operation; wherein the RF remote access device is adapted to selectively alternate the active set of device configuration profiles between the stored first set of device configuration profiles and second set of device configuration profiles and to generate an RF signal to cause an other end device to perform a predefined operation.

In yet another embodiment, a selectively programmable RF remote access device is provided. The RF remote access device may comprise: a memory adapted to store a set of device configuration profiles selected from a plurality of device configuration profiles; a processor adapted to access the set of device configuration profiles stored in the memory and generate an RF signal based on the set of device configuration profiles; and a transmitter adapted to transmit the RF signal to an end device associated with the set of device configuration profiles to cause the end device to perform a predefined operation.

The embodiment may further comprise wherein the plurality of sets of device configuration profiles may comprise a set of original equipment manufacturer ("OEM") configurations for specific vehicle makes and models. The end device may an automobile and the RF signal causes the automobile to perform one or more of a locking/unlocking function, an engine ignition enable function, a trunk opening function, a remote device recognition, and an alarm function. The set of device configuration profiles may include a first configuration profile associated with a first automobile and a second configuration profile associated with a second automobile, the remote access device adapted to be configured to generate and transmit a first RF signal to cause the first automobile to perform a predefined operation and to generate and transmit a second RF signal to cause the second automobile to perform a predefined operation, the first RF signal being different that the second RF signal. The RF remote access device may further comprise a selection means, and wherein the memory is adapted to store a first set of device configuration profiles and a second set of device configuration profiles. The RF remote access device may further be adapted to: receive from the selection means an active set of device configuration profiles selected from the first set of device configuration profiles and the second set of device configuration profiles; generate by the processor a RF signal based on the active set of device configuration profiles; and transmit by the transmitter the RF signal based on the active set of device configuration profiles to a device associated with the active set of device configuration profiles to cause the end device to perform a predefined operation. The RF remote access device may further comprise an encryption module.

In another embodiment, the URHK inventive aspect of the present invention provides a selectively programmable radio frequency ("RF") remote access device, the remote access device comprising: a logic board comprising a processor and at least one memory; a set of user inputs; a transceiver; wherein the memory comprises a first read-only memory comprising a plurality of firmware configurations for the logic board, and a second memory which comprises an active memory partition adapted to store an active firmware configuration; wherein each firmware configuration in the plurality of firmware configurations comprises a set of properties for controlling the processor, the memory, and the transceiver; wherein the active firmware configuration is selected from the plurality of firmware configurations from the first read-only memory by a user and is loaded into the active memory partition of the second memory; and wherein the logic board is automatically configured by the selected firmware configuration loaded into the active partition of the second memory to communicate with an external device via the transceiver.

The system may further comprise wherein each of the plurality of firmware configurations comprise a set of vendor specific properties. The vendor specific properties may comprise one or more of transmit and/or receive frequencies, modulation schemes, binary encoding algorithms, data encoding techniques, packet payload templates, and algorithms configured to generate rolling codes to replicate the function of an original equipment manufacturer ("OEM") keyless entry remote device. The set of user inputs may be adapted to provide for the user selection of a firmware configuration from the plurality of firmware configurations. The transceiver may be adapted to generate an RF signal based on the active firmware configuration and transmit the RF signal to the external device to cause the end device to perform a predefined operation. Each firmware configuration in the plurality of firmware configurations may be associated with a specific external device. The plurality of firmware configurations in the read-only memory may be stored in an encrypted format. The active firmware configuration selected by the user may be decrypted by the processor from the read-only memory prior to being stored in the active memory partition of the second memory. The logic board may comprise an encryption engine. The generated RF signal may comprise a rolling code packet payload.

In another embodiment, the URHK inventive aspect of the present invention provides a method for selectively programming a radio frequency ("RF") remote access device comprising a processor, a first memory, and a second memory, the method comprising: receiving a user input via a set of user inputs on the remote access device, the user input identifying a stock keeping unit ("SKU") number associated with a vehicle make and model; translating, by the remote access device, the SKU number to a set of obfuscated memory addresses for the first memory; reading, by the remote access device, data at each memory address in the first memory from the derived set of memory addresses; assembling, by the remote access device, the data read from the derived set of memory addresses from the first memory into a set of unsorted encrypted blocks; reading, by the remote access device, a protected encryption key associated with the set of unsorted encrypted blocks; decrypting, by the remote access device, the assembled set of encrypted SKU configuration information using the protected encryption key to generate a set of decrypted SKU configuration information; and writing the set of decrypted SKU configuration information to the second memory.

The method of the above embodiment may further comprise: receiving an unprocessed set of SKU configuration information; processing the unprocessed set of SKU configuration information into a set of plaintext blocks; encrypting the set of plaintext blocks using the protected encryption key; assembling the encrypted set of plaintext blocks into a set of unsorted sub-blocks; obfuscating a set of storage locations in the first memory for the set of unsorted sub-blocks; and storing the set of unsorted sub-blocks in the first memory at the set of obfuscated storage locations. The set of obfuscated memory addresses may be derived at least in part by applying a pseudorandom sequence algorithm to the SKU number. The data at each memory address in the first memory from the derived set of memory addresses may comprise a sub-block of a set of configuration information. The set of unsorted encrypted blocks may represent a set of encrypted SKU configuration information for the remote access device. The set of decrypted SKU configuration information may be in an unsorted state. The method may further comprise: sorting, by the remote access device, the set of decrypted SKU configuration information into a sorted set of SKU configuration information, the sorted set of SKU configuration information comprising a set of configuration information for controlling operation of the remote access device. The method may comprise writing the sorted set of SKU configuration information to the second memory. The second memory may be an active configuration memory adapted to determine operation of the remote access device. The set of decrypted SKU information may comprise a set of vendor specific properties. The method may further comprise: generating an RF signal based on the set of decrypted SKU information in the active configuration memory; and transmitting the RF signal to an external device to cause the external device to perform a predefined operation. The generated RF signal may comprise a rolling code packet payload.

Now relating primarily to the Key Bank inventive aspect, the present invention provides systems and methods for reproducing vehicle OEM keys from stored data relating to an original vehicle OEM key. The present invention can reproduce a key from pairing data captured when a key is first paired to a vehicle. This eliminates the need for a "duplicate" key to be paired with the vehicle by a locksmith or dealer. The present invention provides key and/or remote insurance or backup services at the time a key and/or remote is purchased.

When the original key is paired with the vehicle, pairing information obtained from monitoring the key, the ignition coil and transponder, and the vehicle's OBD port along with the vehicle's VIN, customer information, and a unique customer identification number are stored in a secure, encrypted key bank. Encryption is used to secure all data that is captured during the initial pairing session. All information stored in the key bank database is encrypted and may also be secured with a hardware security chip.

Using the key bank, replacement keys and/or remotes can be programmed using the stored information that was obtained at the time of the original pairing. The replacement keys may directly replicate or emulate all features of the vehicle OEM key or may include additional features unique to a universal remote head key ("URHK"). A URHK is a universal key that combines a keyfob/keyless entry system, transponder, and key blade into a single unit that may be programmed and configured to operate with a wide range of vehicle makes and models. URHKs and the systems and methods for programming them are described in METHOD AND APPARATUS FOR IMPLEMENTING MULTI-VENDOR ROLLING CODE KEYLESS ENTRY SYSTEMS, U.S. patent application Ser. No. 14/165,922, filed Jan. 28, 2014, also published as U.S. 2014/0218165, Johnson et al., which is incorporated by reference herein in its entirety. The replacement keys may also replicate transponder functionality by emulating the OEM transponder or by incorporating a physical transponder device. When a replacement key is received by a user or customer a smartphone may be used to authenticate the replacement key.

In a first embodiment the Key Bank inventive aspect of the present invention provides a method for capturing and storing vehicle key information used for replacing vehicle keys, the method comprising: installing an on-board diagnostic ("OBD") port monitor in an OBD port of a vehicle and an ignition coil monitor on an ignition coil of the vehicle; starting and stopping the vehicle a pre-determined number of times using an original equipment manufacturer ("OEM") key that was previously paired with the vehicle; capturing a set of vehicle information associated with the vehicle and a set key information associated with the OEM key in part by monitoring the OBD port by the OBD port monitor and monitoring the ignition coil by the ignition coil monitor; analyzing the set of vehicle information and the set of key information to identify a set of unique information associated with the vehicle and the OEM key; and storing the set of unique information, the set of vehicle information, and the set of key information in an encrypted data store.

The method of the first embodiment may further comprise pairing a replacement key with the vehicle; capturing a set of pairing information associated with the pairing of the replacement key with the vehicle by the OBD port monitor and the ignition coil monitor; analyzing the set of pairing information to identify the set of unique information; and storing the set of pairing information in the encrypted data store. The set of unique information may comprise transponder information. The method may further comprise transmitting the set of vehicle information and the set of key information to a remote server for analysis. The method may further comprise capturing a set of OBD transaction information by the OBD port monitor. The analyzing may further comprise analyzing the set of OBD transaction information to identify the set of unique information. The method may further comprise: capturing a set of owner information associated with an owner of the vehicle; associating the set of owner information with the set of vehicle information, the set of key information, and the set of unique information; and storing the set of owner information in the encrypted data store. The method may further comprise programming a unique identification card with the set of owner information and the set of unique information. The method may further comprise: receiving and processing a request for a replacement key from an owner associated with the set of unique information; programming and configuring the replacement key based on the set of unique information stored in the encrypted data store; and sending the replacement key to the owner, the replacement key requiring no additional pairing processes to function with the vehicle. The programming and configuring may further comprise: cutting a key blade of the replacement key based on the set of key information; programming the replacement key based in part on a vehicle identification code; emulating, in the replacement key, a transponder of the vehicle based on the set of unique information; updating a memory in the replacement key based on a set of unique parameters associated with the vehicle and the OEM key; and programming a set of additional features in the replacement key. The method may further comprise activating the replacement key with a mobile device. The capturing the set of vehicle information may further comprise capturing a vehicle identification number ("VIN").

In a second embodiment, the Key Bank inventive aspect of the present invention provides a system for capturing and storing vehicle key information for programming and configuring replacement vehicle keys, the system comprising: a server having a processor and a memory and comprising an encrypted data storage; an on-board diagnostic ("OBD") port monitor; an ignition coil monitor; a base station in communication with the ignition coil monitor and the OBD port monitor; the base station adapted to monitor and capture, by the OBD port monitor and the ignition coil monitor, communications signals between a vehicle key comprising a transponder, a remote keyless entry system having a processor and a memory, and a key blade, and a vehicle comprising a remote keyless entry system, an engine control unit ("ECU"), an ignition coil, and OBD port connected to the ECU; wherein the communications signals are generated when the vehicle key is operated to cause the vehicle to perform a function; the base station further adapted to transmit to the server the captured communications signals; and the server adapted to identify a set of unique information based on the set of captured communications, and to store the set of unique information in the encrypted data store.

The system of the second embodiment may further comprise: a key configuration device; the server further configured to transmit to the key configuration device the set of unique information based on a received replacement key request; and the key configuration device adapted to receive the set of unique information from the server and configure a replacement key based on the set of unique information. The OBD port monitor may be connected to the vehicle OBD port and the ignition coil monitor is connected to the vehicle ignition coil. The communication signals may comprise: a first data stream comprising information obtained by monitoring a first set of communications between the transponder of the key and the ignition coil by the ignition coil monitor; and a second data stream comprising information obtained by monitoring a set of ECU information in the vehicle ECU by the OBD port monitor. The system may further comprise a card programmer adapted to program a unique identification card with the set of unique information and an associated set of owner information. The server may further be adapted to receive an activation signal from a mobile device and transmit to the mobile device an authentication signal, the authentication signal adapted to enable functionality on the replacement key. The system may further comprise an OBD dongle adapted to connect to the vehicle OBD port, receive the authentication signal from the mobile device, and update the replacement key based in part on the activation signal and a set of updated vehicle information.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 22 provides a flowchart of the process of generating a replacement key according to an embodiment of the present invention.

DETAILED DESCRIPTION

The URHK aspect and the Key Bank aspect of the present inventions will now be described in more detail with reference to exemplary embodiments as shown in the accompanying drawings. While each aspect of the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

FIGS. 1-16 relate primarily to the URHK aspect present invention.

Figure 1:
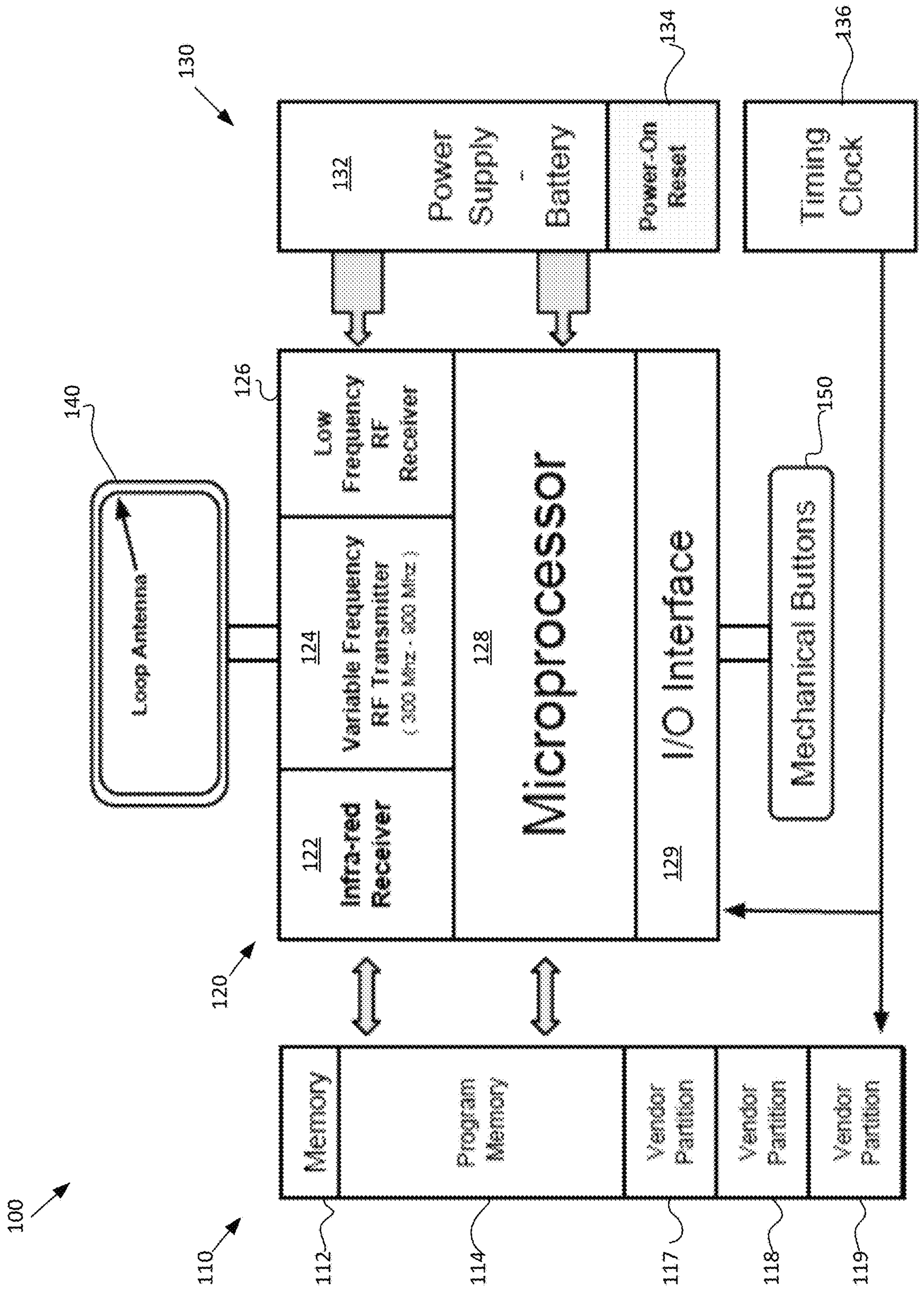
FIG. 1 provides a schematic view of one embodiment for the high level circuit implementation for a rolling code keyless entry device.

With reference to FIG. 1, a schematic view of an embodiment of a remote entry device 100 according to the present invention is provided. The remote entry device primarily comprises a processing unit 120 and as described herein is not limited to "entry" function but may include a variety of key operations. The processing unit 120 of the remote entry device 100 comprises a microprocessor 128, I/O interface 129, infra-red receiver 122, variable frequency RF transmitter 124, and low frequency RF receiver 126. The processing unit is also operatively connected to a loop antenna 140, mechanical buttons 150, power unit 130, timing clock 136, and memory module 110.

The processing unit 120 is comprised of a suitable microprocessor 128 which may be a microcontroller or Application Specific Integrated Circuit (ASIC) having a general processor core, static and volatile memories, hi-resolution timers, standard integrated circuit interfaces, cryptographic acceleration modules, transceiver acceleration and power management features. The static memory in the processing unit may be supplemented by external memory 112 in the memory module 110 in electrical communication with the processing unit. External memory 112 in the memory module 110 may be high capacity and/or high security and tamper resistant. This type of memory provides a greater security margin to both the user and the operation of device 100. The system timing may be provided by a timing clock module which may be a separate module 136 or may be integrated into the microprocessor 128. The system timing signals are used to control the state of the memory module 110, I/O interface 129, the microprocessor 128, and the transmitter 124 and receivers 122 and 126. The I/O interface 129 de-bounces the signals from the mechanical buttons 150 but is also a general purpose interface for other devices that may be connected to the remote entry device 100.

The memory module 110 may comprise two primary forms of data: the active configuration and possible configurations. The active configuration is stored within the program memory 114 that is easily accessible for the processing unit 120. This block of data describes how the remote entry device 100 should behave when asked to perform a remote access emulation task. In addition, information related to active rolling code seeds, encryption keys, and other sensitive information may be stored in separate, protected areas of the memory module 110 such as vendor partitions 117, 118, and 119.

Possible configurations stored in memory module 110 will vary depending on the implemented method of configuration. For standalone applications with user inputted configuration, all possible configuration data will need to be stored. When a configuration tool is used or the system is intentionally limited to a small number of remote devices, the possible configuration memory may be very small or even not implemented. In either case, the possible configurations will be organized in vendor partitions 117, 118, and 119 based on remote device technology. Vendors or manufacturers with similar functioning remote devices will be combined to meet a lowest common denominator of functions and features with extra functions available on a per remote device basis. This grouping allows for configuration data to be optimized for storage and for efficient retrieval for processing. A set of possible configurations may also be referred to as a set of device configuration profiles. A set of device configuration profiles may be one or more profile. A grouping of sets of device configuration profiles may contain one or more sets of device configuration profiles.

The required amount of memory to store possible configurations may vary between 0-bits for tool configured remote device system to many megabits for stand-alone field configured remote devices. Memory requirements may also be dictated by which vendor profiles are included in a particular implementation. Exemplary information that may be stored in a vendor profile is provided below in Table 1.

TABLE 1

| Data Type | Data Stored |
|---|---|
| VendorID | Vendor ID information |
| Remote Device Configuration | Available Remote Device Functions |
| | Button Map |
| | Button Behavior Configuration |
| | LED/Feedback Configuration |
| | Button Function Codes |
| | Advanced Remote Device Control Configuration |
| Packet Formatting | Serial Number Configuration |
| | Payload Type ID and format |
| | Rolling Code Hopping Mode |
| | Required Preamble/Postamble |
| | Error Correction Mode |
| | Encryption Type |
| | Pairing Mode |
| | Padding/Dummy Data Configuration |
| Transmitter Configuration | Transmit Channel (RF, IR, etc) |
| | Modulation Mode |
| | Data Encoder Mode |
| | Transmitter Data Rate |
| | Transmitter Frequency Configuration |
| | Transmitter Power Level |
| | Function Codes |
| Advanced Functions | LF Transponder Configuration |
| | Passive Entry Configuration |
| | Location Based Access |

The processing unit 120 runs custom application code that supports managing I/O, generation of emulated remote device data, changing remote device configuration, interfacing with communication interfaces, and other advanced features. The application code is stored either in the non-volatile memory in the microprocessor 128 or in external memory 112. The application code can be updated at any time to support new remote device configurations, new features and fix problems. Updated application code may or may not affect the current remote device configuration.

The variable frequency RF transmitter 124 provides the processing unit 120 with the ability to send and receive data from entities that are not the user. These other entities can include a target vehicle access system, a remote device configuration tool, another compatible remote device, global positional systems, or other acceptable data sources.

In one embodiment, the variable frequency RF transmitter 124 may be a highly configurable, frequency agile, ISM band transmitter. Using a standard data interface, the processing unit 120 can enable, configure, and pass data through this transmitter such that it matches the original transmission of an OEM or aftermarket vehicle remote device. For more advanced functionality, a receiver 126 may be added to create a full transceiver. The transmitter 124 features a wideband configured loop antenna 140 compatible with the full range of transmit frequencies of the emulated remote devices. The loop antenna 140 may be optionally integrated into the processing unit 120. The antenna circuit may tested and configured for optimal transmit power. The frequency of the transmission by the RF transmitter 124 may be dynamically adjusted. The RF transmitter 124 is frequency agile. The loop antenna 140 may be dynamically adjusted and the RF transmitter's 124 parameters may be changed to optimize performance via a matching network that optimizes impedance from the RF transmitter 124 to the loop antenna 140. By utilizing the matching network and by optimizing the impedance an optimal transmission signal is obtained. Furthermore, this optimization suppresses the transmission harmonics and filters unwanted transmission frequencies. The transmission frequency range modified in this manner is dynamically adjustable, e.g., it may be set to any frequency in a range from 300 MHz-860 MHz. In contrast to known fixed frequency remote devices, the frequency adjustment feature provides the remote device 100 with the ability to work with, for example, cars in American, European, and Asian markets in addition to serving as a filter for unwanted frequencies. An infra-red receiver 122 may also be added to provide for the processing unit 120 to receive infra-red signals.

The remote entry device 100 also comprises a power unit 130. The power unit 130 comprises a power supply/battery 132 and a power on reset module 134. In another embodiment the remote entry device 100 may be powered by line power instead of by the battery 132. The processing unit 120 will place the remote device in a low-power standby or sleep mode when not executing a remote access or configuration. User input (passive or active) will wake the remote device from its low power mode to execute the desired function. For more advanced functionality, the remote device unit may wake up periodically based on low power timers (without any user input) to execute functions.

The remote device may have a power-on reset system 134 and/or brown/out reset system to maintain data integrity of the remote device even in the case of an inadequate power supply. The processing may alert the user via an output interface that the remote device battery is low or faulty and requires attention.

Generation of a rolling code is performed by the microprocessor 128. In one embodiment, the rolling code is transmitted as a binary data stream. The binary data stream is assembled based on protocol information stored in the remote device configuration memory which may either be integrated into the microprocessor 128 or may be stored in the external memory 112. Each protocol will be made up of different binary components that will vary on content and behavior based on the remote device to be emulated. Components such as preambles, serial numbers, and functions codes will remain mostly fixed for most protocols. Conversely, components such as rolling codes, encrypted codes, and checksums will vary frequently if not with every user input. The processing unit 120 retrieves from memory or generates such components as dictated by the protocol.

Figure 13:
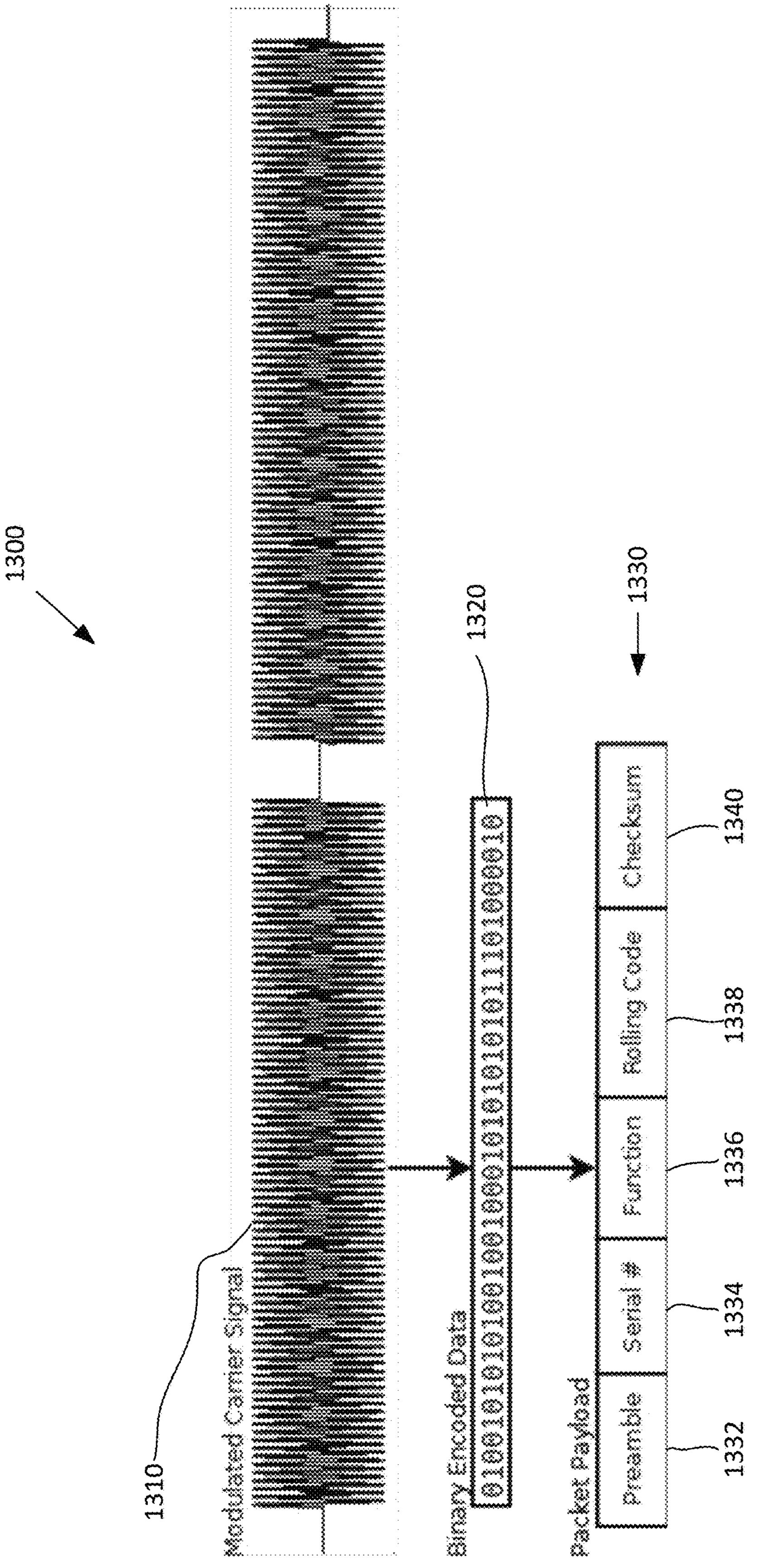
FIG. 13 provides a diagram of one embodiment of a binary data stream transmission using RF transmission schemes.

One embodiment of a typical binary data stream as transmitted is shown in FIG. 13. The diagram 1300 shows the modulated carrier signal 1310 as an RF transmission. The modulated carrier signal 1310 is an ISM band (315 MHz, 434 MHZ, etc) signal that has been modulated via OOK, ASK, FSK, PSK, etc to carry the binary encoded data 1320. This binary encoded data 1320 makes up one or more packet payloads 1330 that hold all the information needed by the vehicle to calibrate, authorize and execute a remote access function requested by the user. The packet payload 1330 may comprise a preamble 1332, serial number 1334, function 1336, rolling code 1338, and checksum 1340. Vendors use a wide range of packet payload formats so the proposed device must be able to generate the required payload for a specific manufacturer. The vendor profiles are referenced to determine the type of payload that will be transmitted.

With reference again to FIG. 1, rolling codes and encrypted values are generated as need by the processing unit 120. The processing unit may make use of cryptographic modules to accelerate the generation process. These modules provide support for standard cryptographic primitives and protocols or may be custom and proprietary acceleration blocks. Rolling code and encryption operation not performed in dedicated modules will be performed by application code.

The processing unit 120 tracks remote code generation and stores any increments or changes to the rolling code or encryption system with each button press. Rolling code or encryption algorithm behavior is specified in the remote device protocol currently selected.

Proper timing of the binary data stream is achieved using hi-resolution timers that are part of the processing unit 120. Precision timing is maintained by either a crystal or RC oscillator in the microcontroller/ASIC or external.

Typical operation of the remote entry device 100 has the user engage one of the input elements such as mechanical buttons 150 (or the remote device unit is passively activated by an input). The I/O interface 129 will typically comprise inputs, such as mechanical buttons 150, and outputs. Inputs elements allow the end user to actively or passively affect the functional behavior of the remote device 100 including configuration operations, pairing commands, and remote access. Output elements relay useful information to the end user about the status of the vehicle, remote device configuration, pairing procedures, battery level, and result of remote device access commands.

The input elements of the remote device may have generic markings for certain common remote device access functions or the user may have the options of customizing the inputs to best match the functionality. The input and output elements are linked to the processing unit 120 that can process input requests and respond with output information as well as send and receive information via the remote device's communication interfaces. The processing unit 120 stores information relating to current and possible remote device configuration, remote device status, and vehicle status. Input elements are actively filtered or debounced by the processing unit 120 to provide clean, reliable user input.

If the input from a user is valid based on the current remote device configuration, the processing unit 120 accepts it and processes a functional request. The processing unit 120 may then relay information back to the user, use the communication interfaces to do a data transaction with another entity, or both. Functional requests from user input are classified as either remote access or configuration. Remote access requests are the convenience and management functions the remote device 100 is currently configured to perform. These include both the original functions of the OEM remote device the remote device 100 is currently emulating and any new functions added. Configuration functions are those that cause the processing unit 120 to alter how it responds to remote access requests.

Remote device functionality is not limited to direct emulation of car access function, but may also include security transponders, passive entry, and other vehicle or non-vehicle related functionality. Remote device emulation tasks require the processing unit 120 to execute, e.g., the following set of standardized emulation routines:

1. Retrieve the current remote device configuration and status from non-volatile memory, either the integrated memory in microprocessor 128 or the external memory 110.
2. Configure the RF transmitter 124 for the proper frequency, power level, modulation scheme, and data rate via standard data interface.
3. Generate or retrieve any required fixed, rolling, or encrypted codes using cryptographic modules or subroutines.
4. Assemble a complete binary stream of remote device data to be transmitted and stored in volatile memory.
5. Pass the binary stream through the transmitter with proper timing via a data interface.
6. Based on the remote device configuration, monitor the user input and repeat any required part of transmission as long as input is maintained active or end transmission after a certain interval.
7. Update any rolling code counters for the protocol.
8. Place remote device 100 into sleep mode.

For any remote access operation that requires the remote device 100 to receive data from the target vehicle, the processing unit 120 will configure the receiver, receive data, decode it, and generate the necessary response behavior based on the remote devices protocol.

Figure 2:
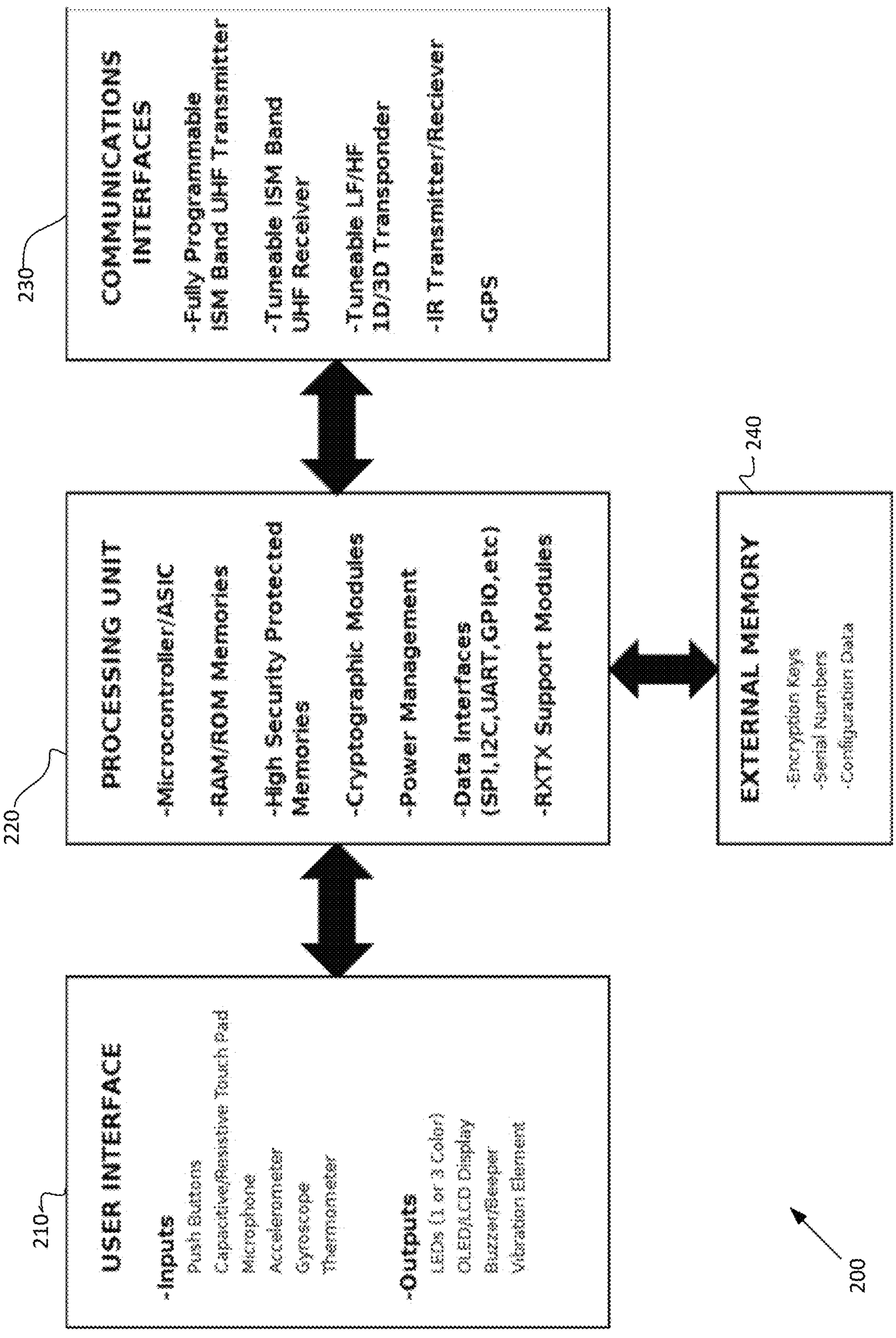
FIG. 2 provides a diagram of the typical functions of a rolling code keyless entry device.

With reference now to FIG. 2, a block diagram 200 of one embodiment of the typical functions of a rolling code keyless entry device is provided. The diagram 200 depicts the various functional elements of a rolling code locking system, specifically the user interface 210, the processing unit 220, the external memory interface 240, and the various communication interfaces 230 that may be implemented. The interfaces that are implemented are application specific and may vary across products. The user interface 210 may comprise both inputs and outputs. The inputs for user interface 210 may include a set of push buttons, capacitive/resistive touch pad, microphone, accelerometer, gyroscope, and thermometer. The outputs for the user interface 210 may include LEDs that may comprise one or more color, an OLED/LCD display, a buzzer or beeper, a polyphonic speaker, and a vibration element. The processing unit 220 may comprise a microcontroller/AISC, RAM/ROM memories, high security protected memories, cryptographic modules, power management modules, data interfaces (e.g., SPI, I2C, UART, GPIO), and RXTX support modules. The communications interfaces 230 may comprise a fully programmable ISM band UHF transmitter, a tune-able ISM band UHF receiver, a tune-able LF/HF 1D/3D transponder, an IR transmitter/receiver, and a GPS module. The external memory 240 may comprise RAM/ROM memories, solid state memory banks, magnetic memory banks, and may store encryption keys, serial numbers, and configuration data.

Figure 3:
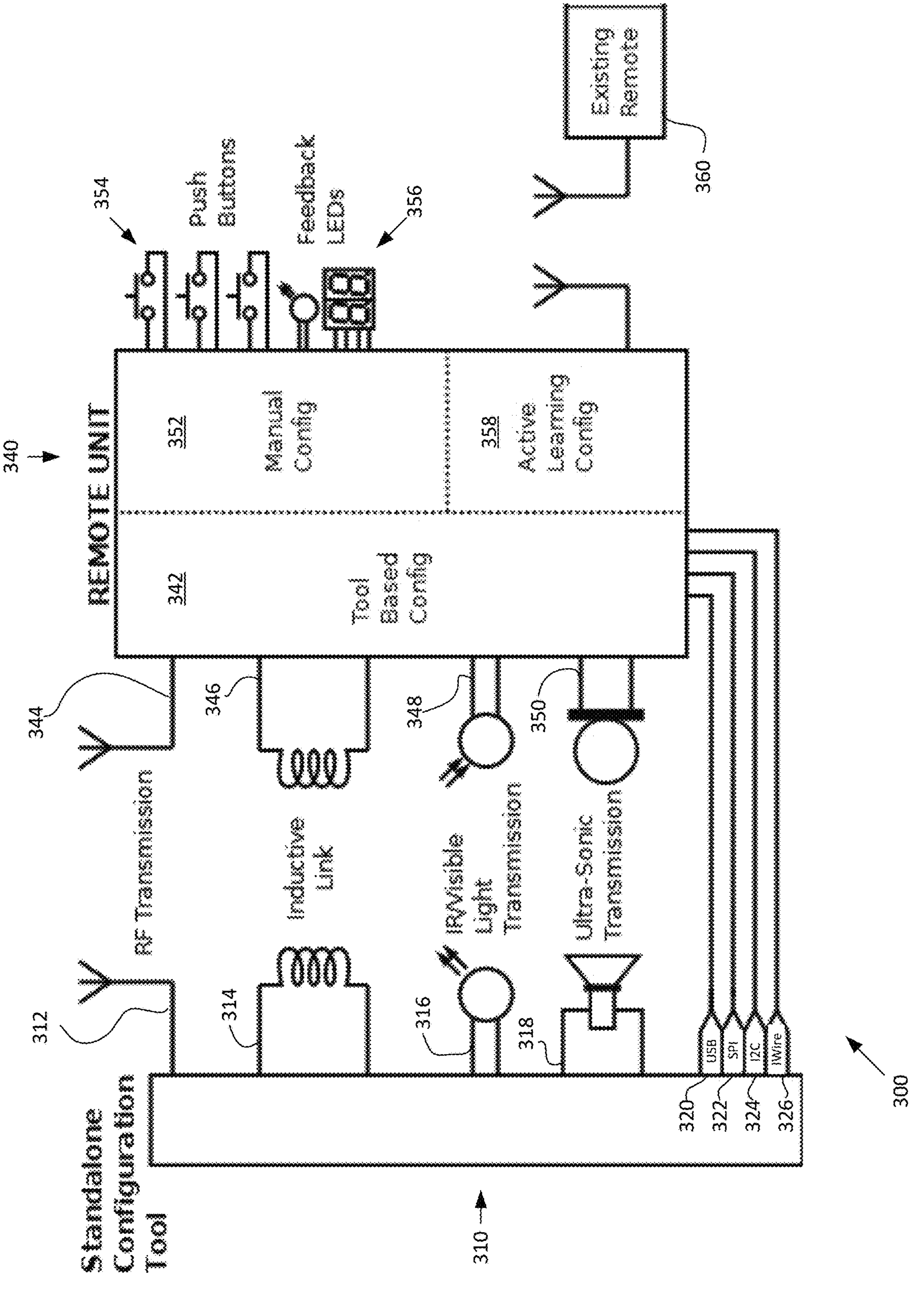
FIG. 3 provides a schematic diagram of an embodiment of an external device that may be used to program, configure, or reconfigure a rolling code keyless entry device.
Figure 4:
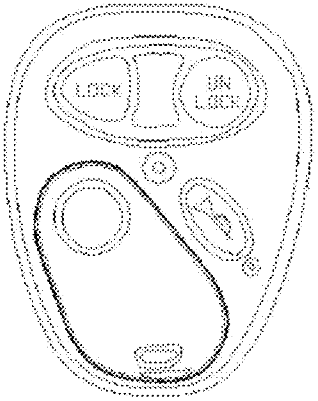
FIG. 4 provides a plan view of an embodiment of a keyless remote entry device.
Figure 5:
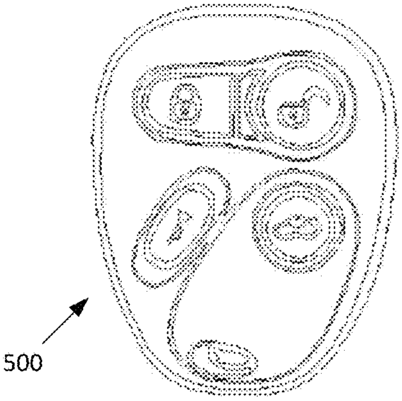
FIG. 5 provides a plan view of an embodiment of a keyless remote entry device.
Figure 6:
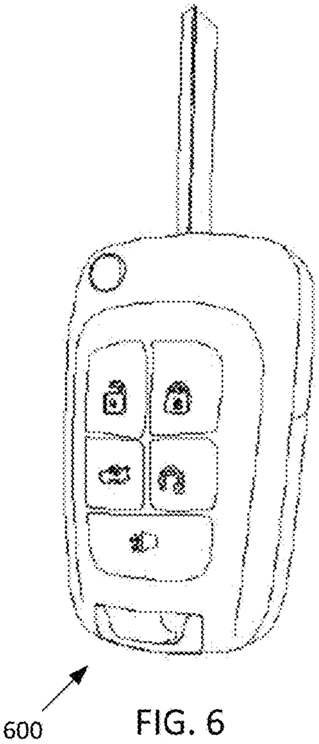
FIG. 6 provides a plan view of an embodiment of a keyless remote entry device.
Figure 7:
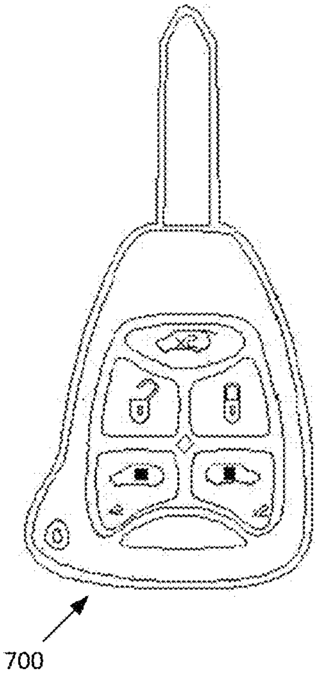
FIG. 7 provides a plan view of an embodiment of a keyless remote entry device.
Figure 8:
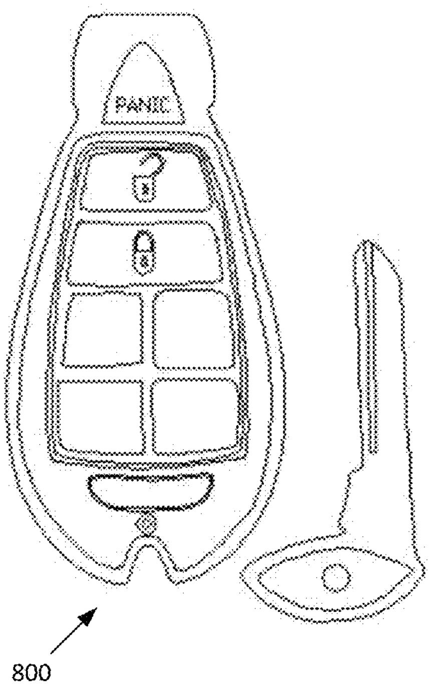
FIG. 8 provides a plan view of an embodiment of a keyless remote entry device.

With reference now to FIG. 3, schematic diagram 300 represents one exemplary embodiment of an external configuration tool or device 310 that may be used to program, configure, or reconfigure a rolling code keyless entry device 340. The diagram 300 shows a collection of many of the possible methods of configuring the remote device 340. In a typical implementation only one or at most two methods would be available. The external device 310 would typically comprise at least one of an RF transmitter 312, inductive link 314, IR transmitter/receiver 316, and ultrasonic transmitter 318. The external device 310 may also be operatively connected to the keyless entry device 340 through a USB interface 320, SPI interface 322, I2C interface 324, or IWire interface 326 present on both the external device 310 and keyless entry device 340. FIG. 3 depicts the three main modes for configuring the device 340, the tool based approach, active learning configuration, and manual configuration.

The configuration interface for the remote device 340 may be either a user interface such as push buttons 354 or may be a configuration tool such as external device 310. Configuration tasks require the processing unit of the remote device 340 to execute, e.g., the following set of standardized setup routines:

1. Check if configuration command was read or write. Reply with current configuration if read, proceed to 2. if write.
2. Receive write password from configuration interface.

3. Check that no write restrictions have been placed on the remote device configuration.
4. Receive configuration data from external device 310 or pull data from possible configuration datapool.
5. Verify configuration integrity and confirm reception of data to configuration interface.
6. Generate any unique serial numbers, seed values, or encryption keys.
7. Store those keys, serial numbers, and serial numbers.
8. Place processing unit and transmitter into sleep mode.

This configuration may be performed in any of the three previously mentioned configuration modes. When using the tools-based approach custom hardware may be used to program the device 340 through the tool-based configuration module 342 using RF transmitter/receiver 344, inductive link 346, IR or visible light transmitter/receiver 348, or ultra-sonic transmitter/receiver 350. When the remote device 340 is part of a tool-based configuration scheme, the user or an authorized agent of the user (e.g., a locksmith) can setup the remote device using a stand-alone tool, such as external device 310, of variable complexity. The external device 310 may have a computer interface or be fully standalone. The external device 310 may be battery powered or require an external power source. The external device 310 may have flexible limitations to how it may configure remote devices. The external device 310 may be operatively connected with the remote device 340 over a wide range of interfaces including but not limited to: direct electrical connection using a standard data interface such as USB 320, SPI 322, I2C 324, UART 326, etc. or a custom electrical interface, this interface may encrypt the configuration data; RF transceiver 312 using either frequencies related to the emulated remote devices or unrelated frequencies of convenience; inductively coupled data link 314 similar to RFID, this approach does not require the remote device 340 to have a battery present at configuration as power can be provided via the inductive link 314/346; an ultrasonic emitter and transducer link 318; or an IR/visible LED emitter and photodiode link 316. The external device 310 may allow for a large amount of data to transferred in the remote device setup process. The external device 310 may change or add to every aspect of the remote device configuration up to and including the firmware of the remote device itself.

In the manual configuration mode a user or a technician configures the remote device using the mechanical interfaces such as push buttons 354 that are operatively connected to the manual configuration module 352. In manual configuration mode, feedback may be provided to the end user through, for example, the feedback LEDs 356.

When the user interface, e.g., push buttons 354, is also the configuration interface, the remote device will be provided to the user in a neutral state with no configuration information present in memory. The user can then use the available input elements to enable configuration mode, enter the configuration password, and enter the desired vendor profile code. The user output elements such as feedback LEDs 356 will confirm if the configuration process was successful. Manual configuration will not allow the user to specify any remote device protocol details as these are stored in the possible configurations memory. The user may only specify a short vendor/protocol code.

In one embodiment, a special case of the manual configuration process is a remote device implementation that can learn its configuration information from another remote device. This is called active learning mode. In active learning mode, the active learning configuration module 358 is "trained" using data from an existing remote device 360. In active learning mode, the remote device 340 is placed in configuration mode by the user and the remote device monitors for an RF signal. Based on the received signal, the remote device 340 sets all the necessary configuration memory values to match the protocol of the target key. Once the complete RF signal (or signals) are received, the remote device 340 gives the user an indication via feedback LEDs 356 of whether or not it was able to successfully configure itself.

With reference now to FIGS. 4, 5, 6, 7 and 8, plan views of several form factors of OEM keyless entry remote devices are depicted. Keyless entry remote devices are available in a wide range of form factors. The OEM devices 400, 500, 600, 700, and 800 represent some of the devices the present invention may emulate. FIGS. 4, 5, 6, 7 and 8 show some of the more popular types of keyless entry remote device. The OEM device 400 and OEM device 500 represent typical RF remote device access units. OEM device 600, OEM device 700, and OEM device 800 are remote device units with integrated key blades of varying styles. The present invention may be implemented in any these form factors. The external cases may also be customized for various markets and applications.

Figure 9:
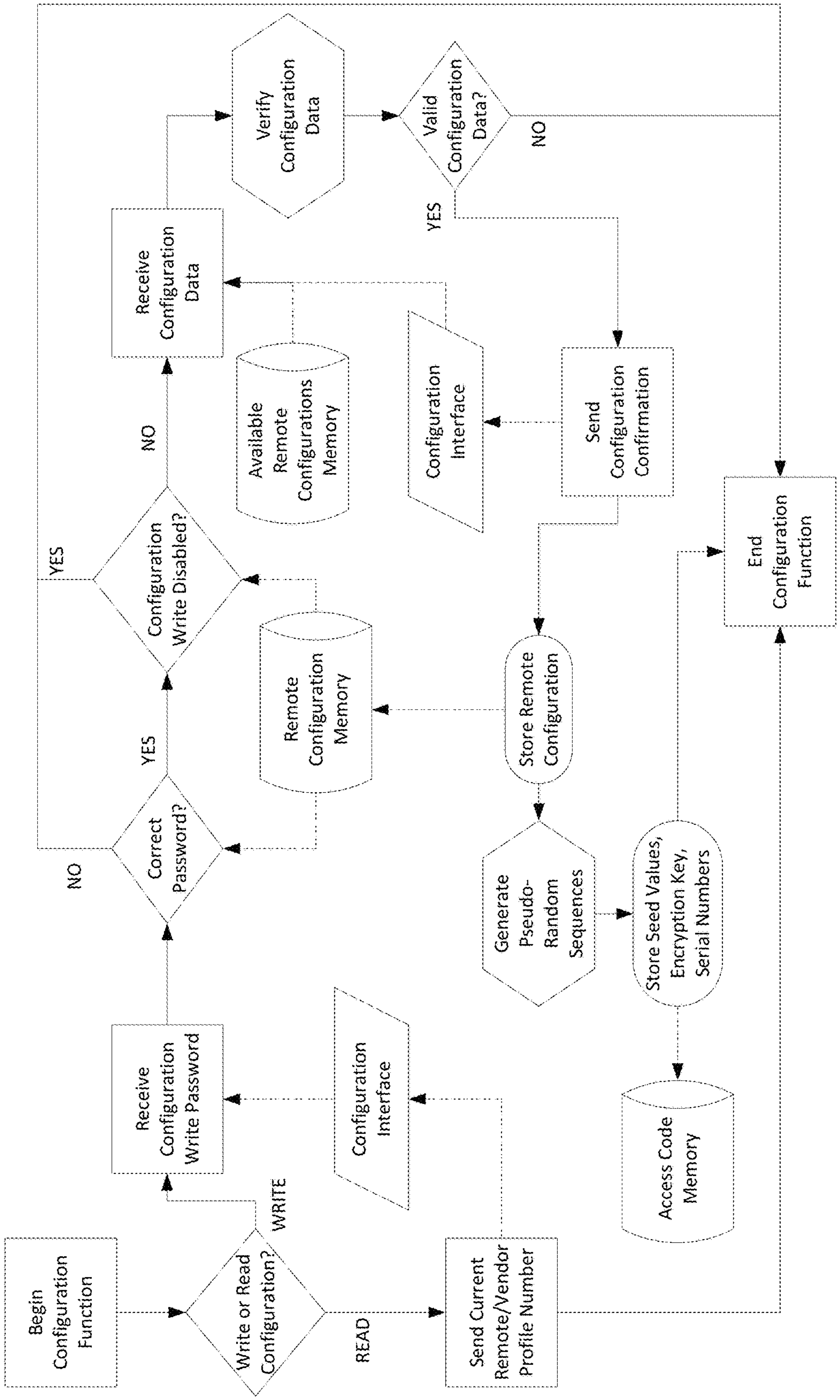
FIG. 9 provides a flowchart depicting one embodiment of the process for managing configuration requests of a rolling code keyless entry device.

With reference now to FIG. 9, a remote device configuration application code flow chart 900 depicts one embodiment of how a remote device as described in the present invention may handle the processing of configurations requests for various configuration modes and interfaces. The actual flow will depend on the hardware interfaces that are present for communicating the configuration settings to the remote device. In one embodiment, the configuration function begins with the remote device determining if the configuration is being read or written. If it is being read the device sends the current profile information and the configuration function returns to the interface and ends. If a write configuration is being performed, a password may need to be entered. If correct, and configuration writing is enabled, the new configuration data is received by the remote device. If incorrect, or if configuration writing is disabled, the function is ended. This determination is made by retrieving information from the remote device memory. The configuration data is verified by the remote device and if valid, the configuration confirmation is sent to the interface and the configuration is stored in memory. After the configuration is stored pseudo-random sequences are generated, if needed, and these values are stored in the access code memory and the configuration function is ended.

Figure 10:
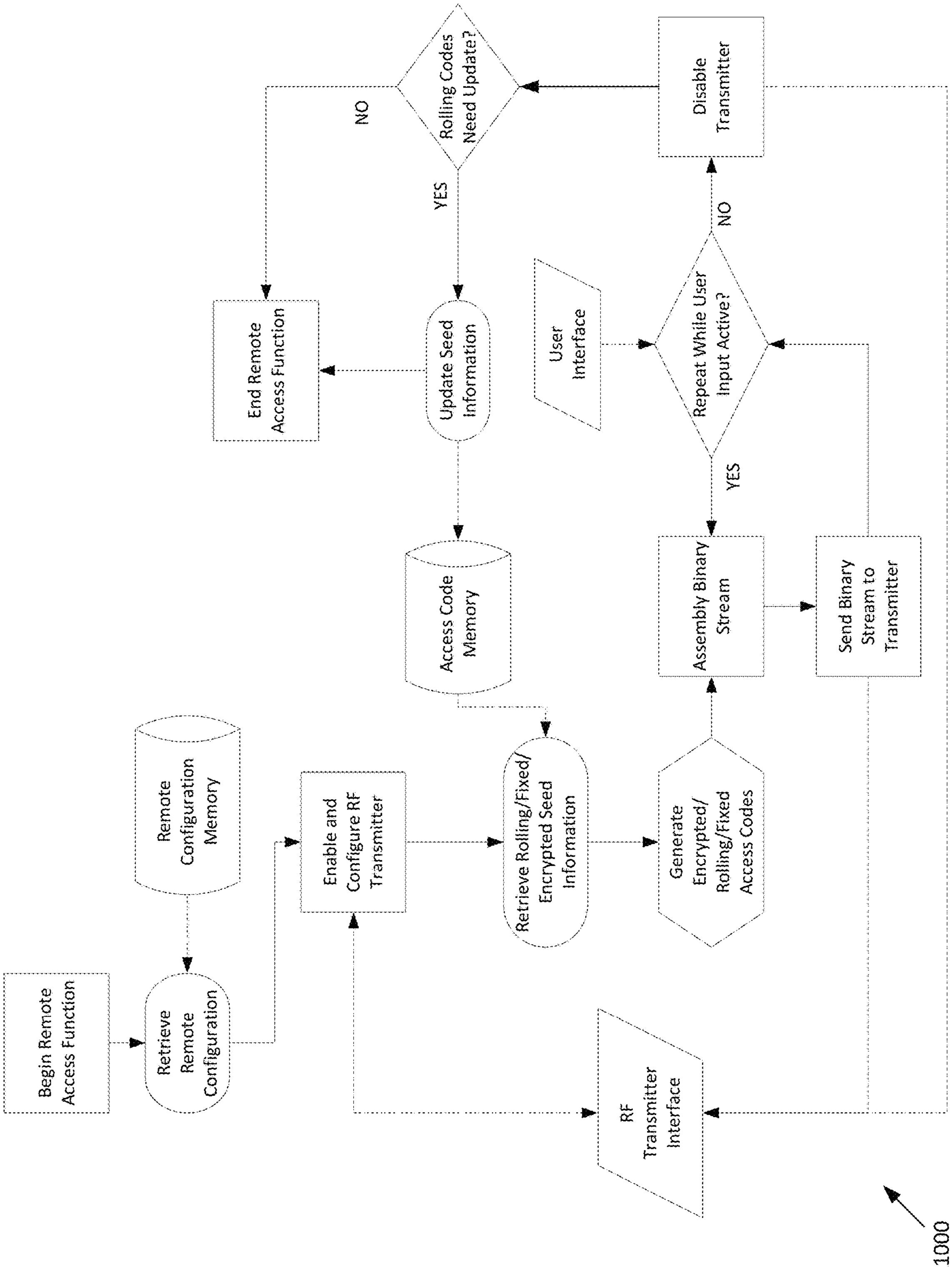
FIG. 10 provides a flowchart depicting one embodiment of the process for managing access requests to a rolling code keyless entry device.

With reference now to FIG. 10, a remote device access application code flow chart 1000 depicts one embodiment of how a remote device as described in the present invention may handle, in general, the processing of remote device access requests. Flow chart 1000 also shows how the transmitter is activated in response to an access event and how the data payload is assembled. In one embodiment, a remote device access request is sent and the remote device configuration is retrieved from the remote device configuration memory. The remote device's RF transmitter is configured based on the remote device configuration. Any necessary rolling code seed information or other encryption or code information is retrieved from the access code memory and the necessary code is generated. A binary stream containing any necessary code and the remote device access function is assembled and sent to the transmitter to be sent to an end device. The function may be repeated, and if not the transmitter is disabled to save power. After the transmitter has been disabled, any code seed information may be updated and stored and the access function is ended.

Figure 11:
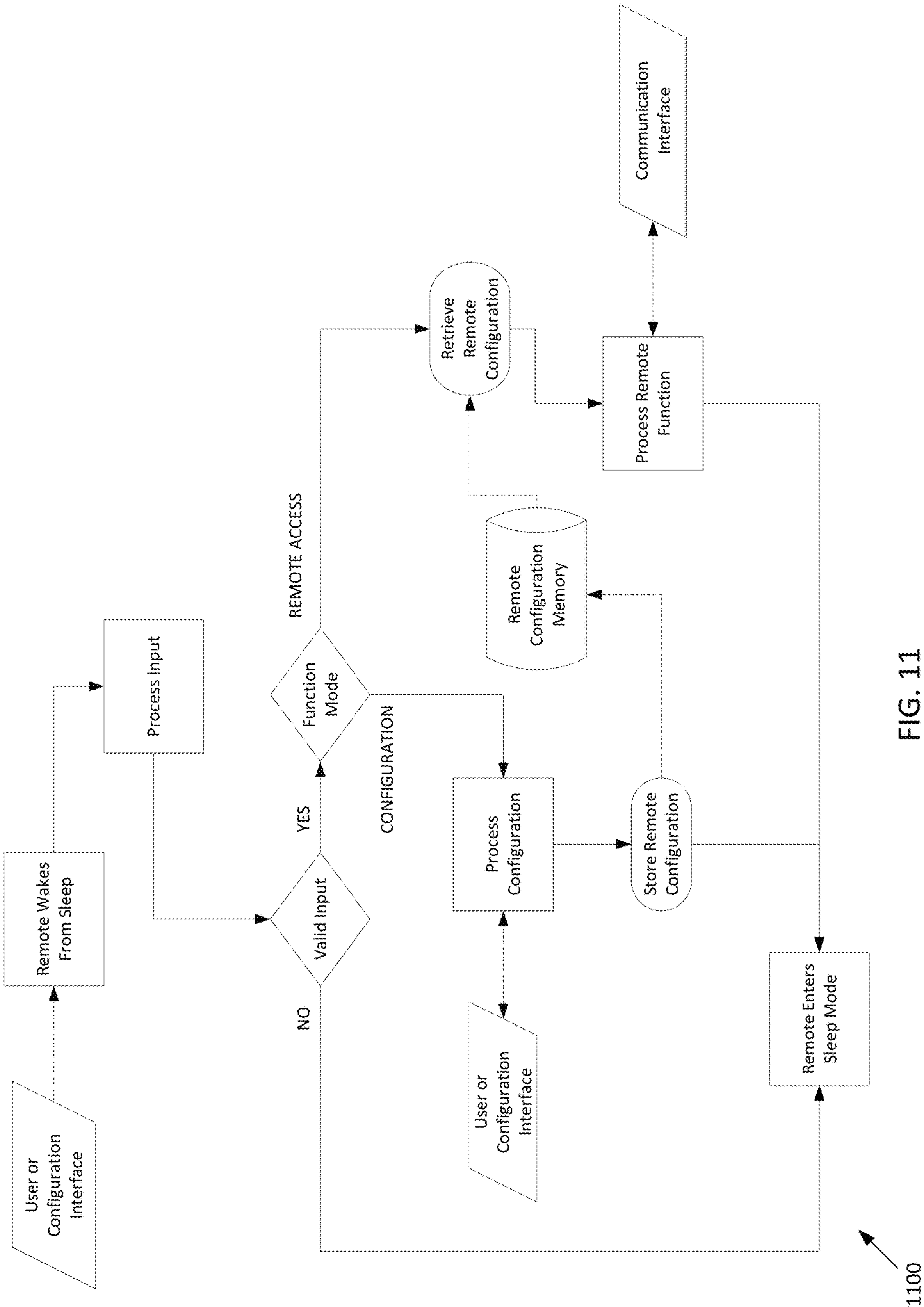
FIG. 11 provides a flowchart depicting an overview of the operational modes of one embodiment of a rolling code keyless entry device.

With reference now to FIG. 11, a flow chart 1100 describes one embodiment how a remote device as described in the present invention may wake from lower power sleep, processes requests, and then power down. In one embodiment, a configuration interface input is received and wakes the remote device from sleep. The input is processed and if valid the remote device enters function mode, if invalid the remote device returns to sleep. The function mode determines if the input is for configuration or remote device access functions. If for access, the necessary configuration is retrieved from the configuration memory, processed, and sent to the communication interface according to the exemplary process depicted in FIG. 10. If for configuration, the configuration request is processed according to the exemplary process depicted in FIG. 9.

Figure 12:
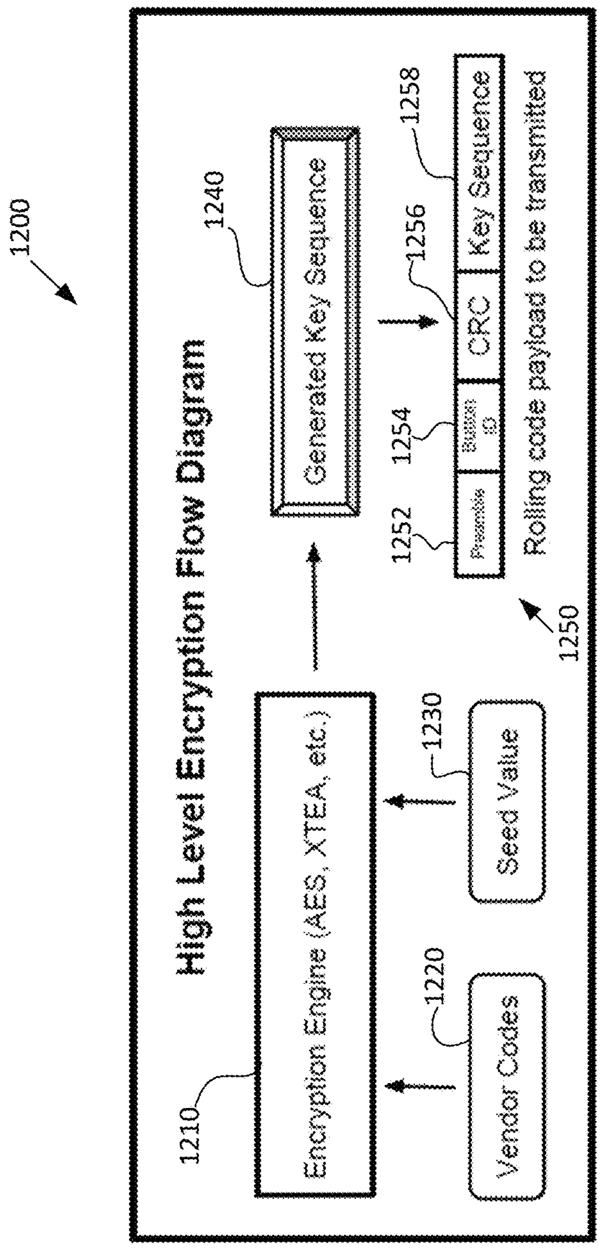
FIG. 12 provides a flowchart depicting one embodiment of an encryption process.

With reference now to FIG. 12, a flowchart 1200 depicting one embodiment of an encryption process is depicted. The flowchart 1200 depicts one embodiment of how stored seed values 1230 and vendor data 1220 may be used to generate encrypted sequences 1250 for insertion into the larger remote device access payload. The encrypted sequences 1250 may comprise a preamble 1252, a button ID 1254, a CRC 1256, and a key sequence 1258. Once generated by the encryption engine 1210 based on the vendor code 1220 and seed value 1230, these encrypted sequences 1250 may then be used to uniquely authenticate the remote device and allow the remote device function to execute. In typical applications, a vendor code 1220 and numeric seed value 1230 are used to generate the security key sequence 1258. The key sequence 1258 is then formatted as payload data that is transmitted via an RF transmitter.

Figure 14:
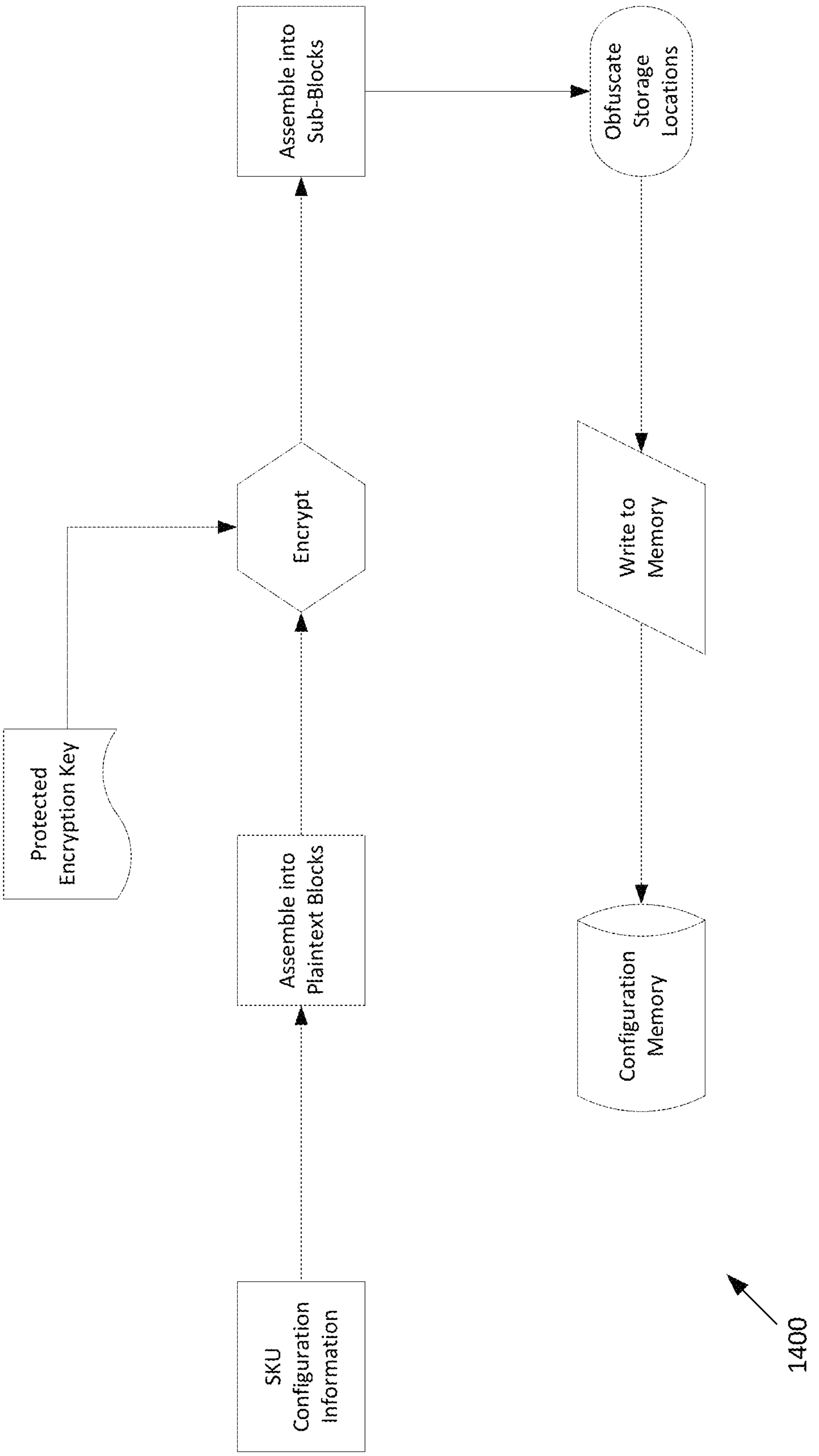
FIG. 14 provides a flowchart depicting one embodiment of a method for securely storing encryption blocks to memory.
Figure 15:
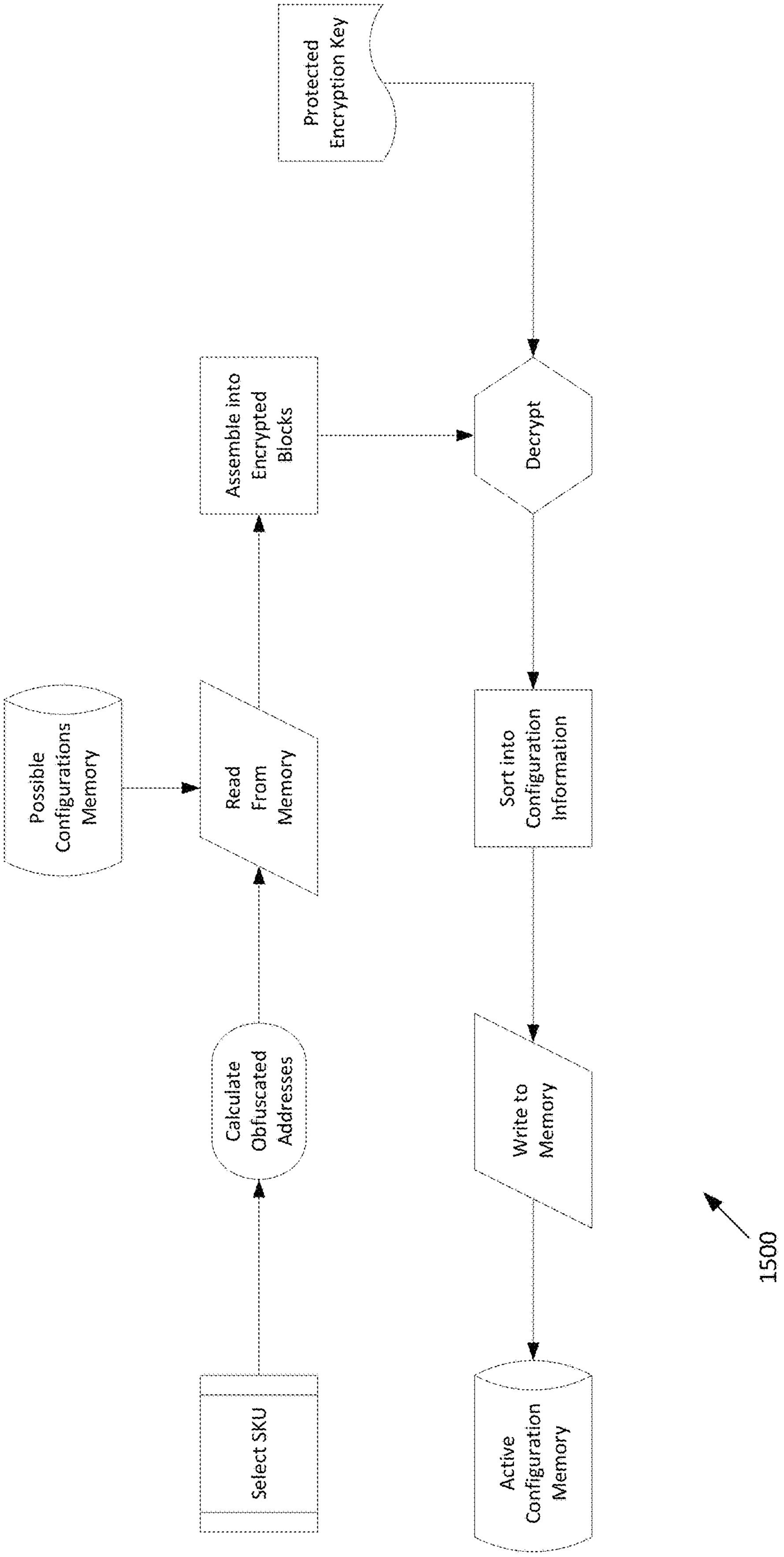
FIG. 15 provides a flowchart depicting one embodiment of a method for retrieving a selected configuration block from memory.

With reference now to FIGS. 14 and 15, flow charts 1400 and 1500 depict one embodiment of how configuration blocks may be stored in and retrieved from memory respectively. All Possible configuration data will be stored securely to prevent leakage of secret or proprietary information that could result in the compromise of the security for one or more remote devices. Blocks of configuration information will be encrypted using industry standard block ciphers with a key stored securely in the processing unit. Encrypted blocks are then stored as sub-blocks distributed to pseudorandom addresses throughout the memory. The sequence of these addresses can be unique to each remote device. Obfuscating the storage of the data prevents a bulk retrieval of data from the memory from yielding information about how remote devices may be configured. This process is shown in the process in flow chart 1400 in FIG. 14.

At configuration, once a SKU is selected, the processing unit calculates the obfuscated addresses for the configuration information of the SKU and reads the data in those addresses. The possible configurations memory stores this data. Those sub-blocks are reassembled into encrypted blocks and a decryption process is applied using the key stored in protected memory. This plaintext configuration information is then sorted and then stored in protected active configuration memory within the remote device until another configuration event is initiated. The configuration recovery processes is shown in flow chart 1500 in FIG. 15.

With reference again to FIG. 14, the flowchart 1400 depicts one embodiment of a process that may occur during development and product assembly, well prior to the end user having possession of the remote. The set of OEM remote SKU configuration information is a possible set of remote setup procedures for all the remotes supported by a particular remote device. This information may be created during the development process for a particular remote device and may be, for example, binary data created specifically to be interpreted by a remote device's microprocessor. The SKU configuration information may be stored in the configuration memory.

This information is efficiently packed according to a specific algorithm or compression technique (e.g., byte/bit alignment) into blocks so that it can be more easily manipulated by the encryption system. The SKU configuration information is then encrypted to protect it from attackers/counterfeiters. However, the encryption process best protects the data set if the encryption key is not known to the attacker. As an extra layer of protection, the encrypted data may be arranged into sub-blocks, which by default are "inorder", and shuffled, rearranged, or reorganized according to an encryption algorithm to place the sub-blocks into an "outoforder" sequence. This shuffling or reordering may be performed by a hidden or secret pseudorandom sequence algorithm. The pseudorandom sequence is configurable such that every remote device may have a different "ordering" of the encrypted sub-blocks. Shuffling the encrypted data greatly increases the difficulty for an attacker attempting to recover contiguous blocks of data to decrypt by shuffling the sub-blocks into an "outoforder" sequence. These shuffled sub-blocks may then be packed into a large binary image that is loaded during production of a remote device into the configuration memory of the remote device. In one embodiment of the remote device, the memory may be a flash memory chip. By purposefully placing the data "outoforder" the pseudorandom sequence algorithm obfuscates the SKU configuration data stored in the remote device's random access memory to prevent discovery. The remote device may then be packaged and sold.

With reference now to FIG. 15, the process depicts one embodiment where the user has selected a device configuration profile or remote configuration for the remote device to emulate. The SKU number selected by the user is translated by the remote device microprocessor using the pseudorandom sequence algorithm into a list of memory addresses. This list appears random to an outside observer, but is in fact the correct device to emulate. The SKU number selected by the user is translated by the remote device. The microprocessor reads the sub-blocks at the address on the generated list and that set of blocks is the encrypted SKU configuration information for the selected OEM remote device. The microprocessor reverses the encryption process and then may store the recovered data into active configuration memory which determines the typical operation of the remote device as selected by the user.

Figure 16:
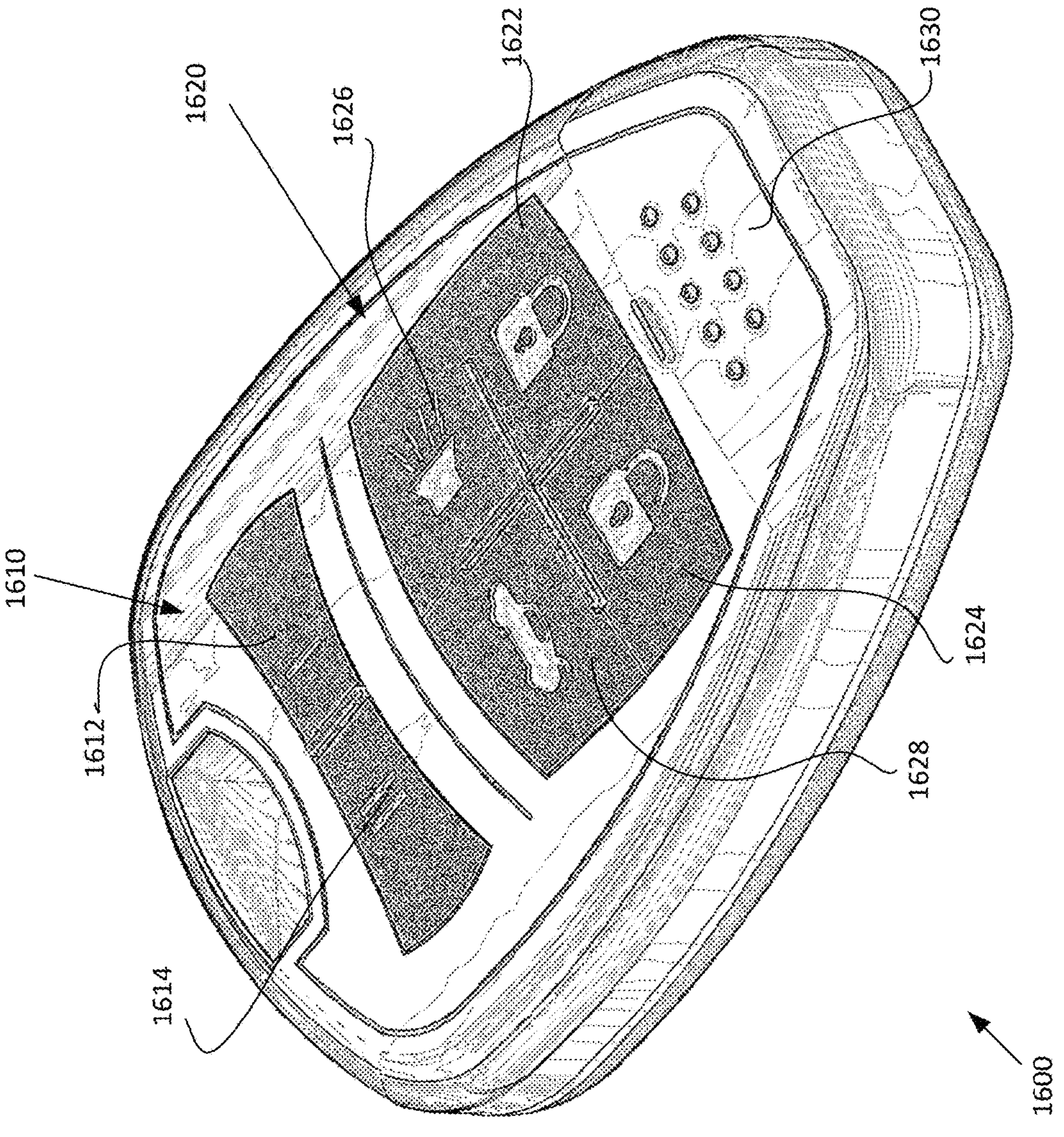
FIG. 16 provides a plan view of an exemplary embodiment of a keyless remote entry device.

With reference now to FIG. 16, a plan view of an exemplary embodiment of a remote device 1600 is provided. In this embodiment, the remote device 1600 does not comprise a physical key, instead it has device configuration profile selection keys 1610, function keys 1620, and secondary function key 1630. The remote device 1600 may further comprise an opening to allow for the attachment of a key ring, lanyard, or other retaining means. In this embodiment, the internal circuitry of the remote device 1600 may comprise a processor, a memory, and a transmitter. The memory may be loaded with one or more sets of device configuration profiles.

In one embodiment, the remote device 1600 may have, for example, two sets of device configuration profiles stored in the memory. To operate the remote device 1600, a user may select, for example, the first of two sets of device configuration profiles stored in the memory. This may be performed by pressing the first device configuration profile selection key 1612 associated with the first set of device configuration profile. The remote device 1600 will automatically be configured to this first set of device configuration profile after the first set of device configuration profile is read from the memory. The function keys 1620 may then be selectively operated by a user to perform the function associated with each key according to the first set of device configuration profile. The lock key 1622 may be used to lock an end device associated with the first set of device configuration profile, the unlock key 1624 may be used to unlock an end device associated with the first set of device configuration profile, the alarm key 1626 may be used to activate or deactivate the alarm of an end device associated with the first set of device configuration profile, and the trunk key 1628 may be used to open the trunk of an end device associated with the first set of device configuration profile. While the function keys 1620 may be associated with specific functions, they may be also be assigned to perform functions different than locking, unlocking, alarm, and trunk according to the configuration of the currently active set of device configuration profile. A user may press the second device configuration profile selection key 1614 to cause the remote device 1600 to read the second set of device configuration profile from the memory and automatically configure the remote device 1600 according to the second set of device configuration profile. The function keys 1620 will then operate according to the functions associated with the second set of device configuration profile.

The remote device 1600 may also have a secondary function key 1630 that may be configured to perform one of a number of tasks. The secondary function key 1630 may be configured to, for example, operate a garage door, operate an additional function on an end device, or activate an other device not associated with the currently active set of device configuration profile. The secondary function key 1630 may keep the same function across all sets of device configuration profiles or may be re-configured based on the currently selected or active set of device configuration profile. The remote device 1600 may also have additional keys, buttons, or switches on its face and may be used to select from and operate according to a plurality of sets of device configuration profiles. The remote device 1600 may also comprise a radio frequency identification ("RFID") or similar RF device to enable the remote device 1600 to handshake or connect to an end device without user operation. The device configuration profile keys 1610 and function keys 1620 may also be replaced by a user to change the look or feel of the physical keys.

FIGS. 17-23 relate primarily to the Key Bank aspect present invention.

While remote-only devices are still sold with new cars, the automotive industry has been moving toward more highly integrated remote and key blade combination devices. These remote head keys are often much more advanced than a typical key blade and transponder device and have the ability to store information about the car.

The URHK is designed to cover the largest range of compatible remotes or stock keeping units ("SKUs") representing vehicle makes and models, as possible. The URHK device emulates the three main features of a modern combination remote head key: the cut key blade, the remote keyless entry radio frequency ("RF") transmitter, and the low frequency ("LF") security transponder. The URHK supports a large range of interchangeable key blades that covers a plurality of blade sizes, shapes, and bitting patterns. The main body of the URHK remote has a mechanism to secure a key blade insert for cutting and normal usage. The URHK RF transmitter is frequency agile. The transmitter is configurable between AM and FM, and also supports various encoding schemes (Manchester, Pulse Width, etc.). The URHK security transponder is able to emulate several different types of OEM transponders. The tight coupling of a typical remote head key to the car means the URHK can be leveraged to create a unique key back-up service, i.e., a Key Bank or "KeyBank". The Key Bank may also be referred to more generally as a key bank. The Key Bank service and URHK device may be provided by iKeyless, Inc. to provide customers or users with a way to back up and replace vehicle keys.

The URHK can serve as a replacement for, or as an addition to, an OEM provided remote head key. The programing operation for the URHK is similar to the user experience of programming universal remote controls for televisions. Beyond the RKE required communication means, the URHK may also contain additional communication channels to support Near Field Communications ("NFC") and Bluetooth Low Energy transceivers ("BLE"). This allows for non-contact programming of the URHK through a mobile device. This interface can also be used to activate unique smart key functions or additional Key Bank services.

The Key Bank service can be used with OEM remote head keys or URHK devices. A user with a compatible vehicle can enroll their keys in the Key Bank service that will securely store a copy of critical remote configuration information. If the user then loses their key, they can contact the Key Bank service and request a replacement. The replacement key will use the stored remote information to give them an exact copy of their remote that works right out of the package.

The replacement key of the present invention works without requiring a "pairing" process. A pairing process for a vehicle key is a multi-step process that typically involves the user performing multiple operations with either the key or vehicle or both that may include opening/closing doors, opening/closing windows, pressing buttons on the vehicle key, operating controls in the vehicle, starting and turning off the vehicle, and also includes authenticating the vehicle key with the vehicle by synchronizing encryption information which may include the entry of a unique PIN. Additionally pairing requires the use of specialized tools that must be connected to either the key, the vehicle, or both and that may only be used by authorized vehicle dealers or locksmiths.

Figure 17:
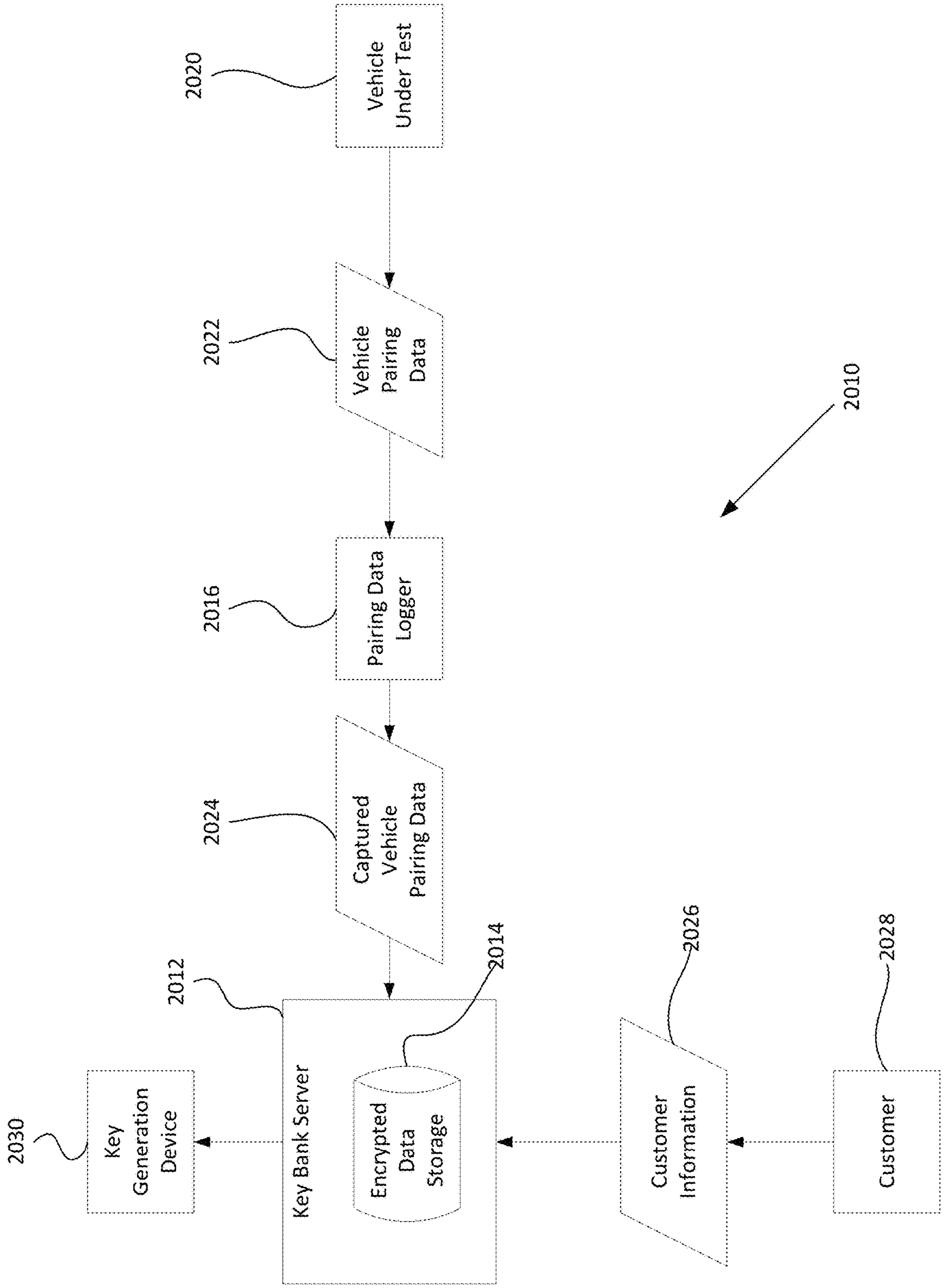
FIG. 17 provides a simplified block-diagram of one embodiment of the system for capturing and storing pairing data when a key is paired with a vehicle.

With reference to FIG. 17, a simplified block-diagram of one embodiment of the system 2010 for capturing and storing pairing data when a key is paired with a vehicle is provided. The system 2010 is adapted to capture and store vehicle key information to be used in replacing vehicle keys. The system 2010 comprises a Key Bank server 2012 having an encrypted data storage 2014, a pairing data logger 2016, a customer 2018, a vehicle under test 2020, and a key generation device 2030. The system 2010 is used to capture unique information about a vehicle and a vehicle key, which may be either an OEM key or a URHK, and store the unique information in the encrypted data storage 2014 after processing at the Key Bank server 2012. In operation, vehicle pairing data 2022 is either passed to or captured by the pairing data logger 2016 from the vehicle under test 2020. This vehicle pairing data 2020 comprises transponder communication information and information collected by monitoring the vehicle under test 2020 OBD port. The vehicle pairing data 2022 is then securely transmitted by the pairing data logger 2016 as captured vehicle pairing data 2024 to the Key Bank server 2012.

The Key Bank server 2012 processes the captured vehicle pairing data 2024 to identify a set of unique information required to create a replacement vehicle key. This process involves the analysis of a plurality of data streams in the captured vehicle pairing data 2024 including information captured from the vehicle ignition coil and information associated with the vehicle ECU captured through the OBD port. The set of unique information includes transponder information associated with the key being analyzed, vehicle security information, i.e., rolling code encryption keys and states, a unique PIN code used in a pairing process, and the vehicle under test 2020 VIN code. The set of unique information is supplemented with a set of customer information 2026 and is stored in the encrypted data storage 2014. The Key Bank server 2012 transmits the information stored in the encrypted data storage 2014 to the key generation device 2030 when it receives an authenticated signal or request for a replacement vehicle key from the customer 2018.

The key generation device 2030 uses the set of unique information to program and configure a replacement key. The programming and configuration involves configuration, programming, or emulation of a transponder in the replacement key. The programming and configuration also involves setting a number of memory registers to specific values stored in the set of unique information. The replacement key is also programmed to execute the functions of the original key from which the unique information was obtained, and may also be programmed to execute additional, unique features. A key blade in the replacement key is also cut by the key generation device 2030 such that they replacement key will work in the original vehicle under test 2020 key barrel.

The expense and hassle to the end user of losing a remote head key is alleviated by using the replacement key generated by the key generation device 2030, which will typically be a URHK. Typically, when replacing a lost key the user must get a totally new key to replace the lost one and this replacement must be provided by a locksmith or vehicle dealer. Even knowing all the information that was stored within a key, it is currently impossible to create an exact replacement copy of the lost key. The replacement key URHK generated by the system 2010 can overcome this problem as it can behave as an "exact copy" of any key SKU it can emulate.

To use the Key Bank 2012 and Key Bank service provided by the system 2010, the user must enroll their car remote head key in the Key Bank 2012 before needing a replacement. Enrolling the remote head key stores necessary information "on file" so that it may be later used by the key generation device 2030 to create a replacement UHRK. If the user had an OEM remote, the data necessary to create a replacement URHK, the set of unique data, must be collected at the time the original OEM key is paired to the vehicle or at a later time by using a special monitoring tool, which may be a separate device or may be incorporated into the pairing data logger 2016, to collect the information during normal operation of the vehicle. If the user already has a URHK the required information may be retrieved directly via the transponder interface in the URHK using a reader tool, which may be a separate device or may be incorporated into the pairing data logger 2016, or by a NFC/BTLE interface in the URHK using a mobile device or PC.

Once the required set of unique key information such as the key's hardware ID and secret key are obtained, it is uploaded to the Key Bank server 2012 where it can be stored securely in the encrypted data store 2014 until the user needs a replacement key. When the replacement key is needed, the user can request a replacement remote from the Key Bank service. The service will use the stored information gained from the original OEM key to program a URHK as an exact replica of the original.

The remote keyless entry portion of the replacement UHRK will function similarly to the previously described URHK device. The contents of the transmitted OEM RKE signal by the URHK will be replicated exactly along with its electrical characteristics. The URHK is able to adjust its transmission frequency, modulation type (ASK or FSK), and data rates depending on the remote it is emulating. The security transponder portion of the replacement URHK fully emulates several existing transponders protocols. These protocols describe how information is read and written by the vehicle to the transponder device. While the physical characteristics (transmit frequencies and data rates) of the transmission will not differ from protocol to protocol, the encryption and communications coding will. In addition to emulating the standard transponders interface, URHK specific transponder behavior will be included. The transponder being a bidirectional communications interface allows for a great deal of diagnostic and configuration options. The SKU selection process can be completed via the transponder interface with the key generation device 2030, the pairing data logger 2016, or by another stand-alone tool that writes the selected remote code to a location in transponder memory. The same tool can also read out usage statistics about the remote and any secret information typically known only to the vehicle and transponder. This information can be used in the Key Banking process.

The authenticating data packet will, similarly, be uniquely generated for each button press using the proper rolling code and encryption schemes. The key advantage is replicating the OEM remote and immobilizer transponder interaction with the vehicle.

When the user receives the remote, they will be able to immediately start their vehicle and use its remote features. No key pairing process will be required. The user will be able to replace the remote as many times as they want as long as they own the car. The system 2010 may also be used to order a complete set of keys when purchasing a used vehicle assuming it had previously been enrolled in the Key Bank service.

Figure 18:
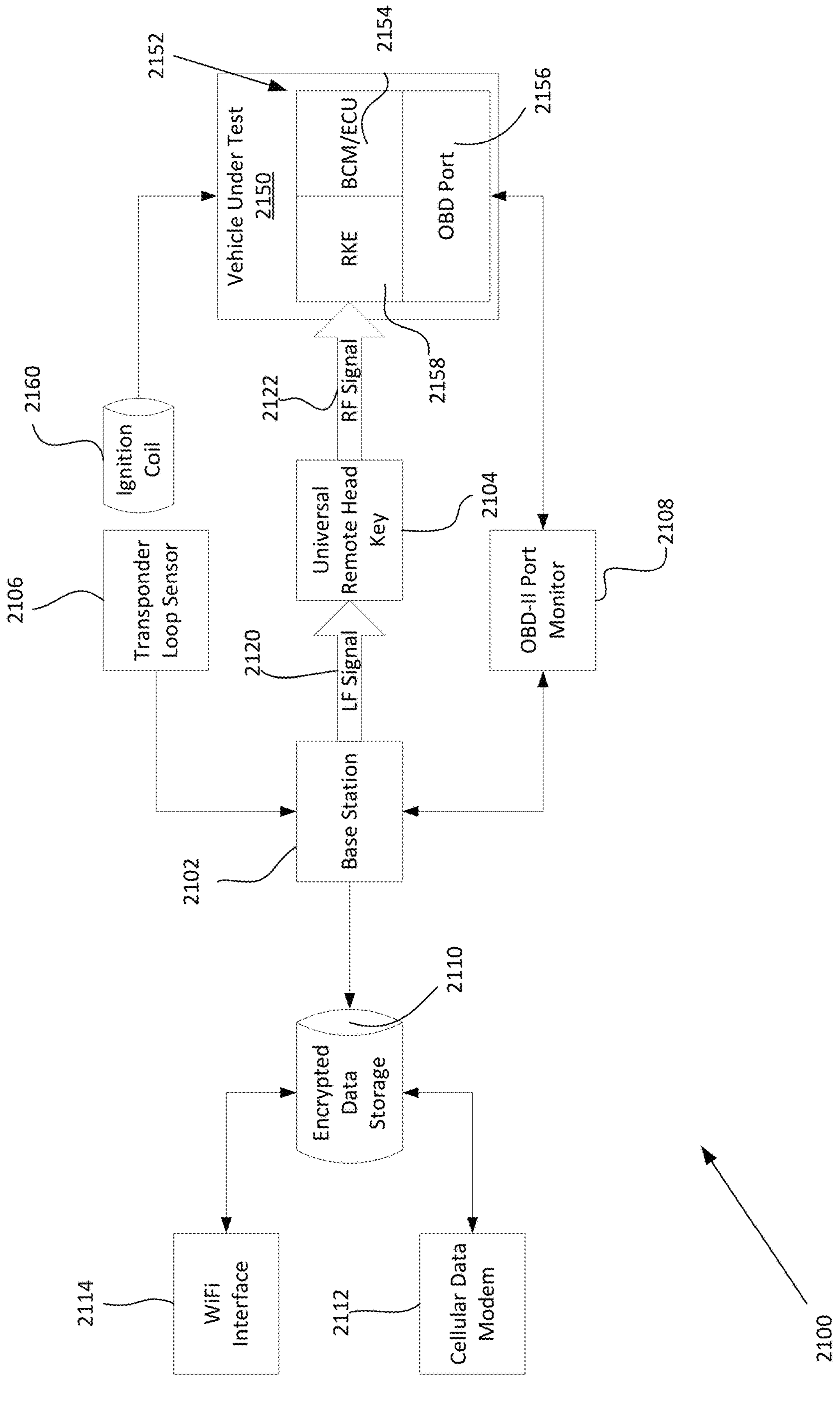
FIG. 18 provides a block-diagram schematic view of one embodiment of the system for capturing and storing pairing data when a key is paired with a vehicle.

With reference to FIG. 18, a block-diagram schematic view of one embodiment of a system 2100 for capturing and storing pairing data when a key is paired with a vehicle is provided. The system 2100 comprises a base station 2102 that may comprise or be connected to an ignition coil monitor or transponder loop sensor 2106 and an OBD port monitor 2108. The system 2100 further comprises an encrypted data storage 2110 that may be connected to local or wide area networks by a Wi-Fi interface 2114, or by a cellular data modem 2112. In operation, the base station 2102 may monitor and capture information from the vehicle under test 2150 by the OBD port monitor 2108 and the transponder loop sensor 2106.

The transponder loop sensor 106 is installed on the ignition coil 2160 of the vehicle under test 2150 and the OBD port monitor 2108 is connected to the OBD port 2156 of the vehicle under test. The OBD port 2156 may be an OBD II port and the OBD port monitor 2108 may be adapted to connect to a standard OBD II connection port. The transponder loop sensor 2106 monitors communications and data that passes between the URHK 2104 and the ignition coil 2160. The transponder loop sensor 2106 may also be used to monitor communications when an OEM key is used. The OBD port monitor 2108 may gather information from vehicle electrical system components 2152 including the BCM/ECU 2154 and the RKE system 2158. The base station 2102 may also communicate directly with the URHK 2104 by a LF signal 2120 to send and/or receive data from the URHK 2104. This communication may include monitoring RF signals 2122 sent by the URHK 2104 to the vehicle under test 2150 RKE system 2158.

In some cases where the RKE functions may not be accessible via the OBD port, low level data analysis of CAN and LIN bus transactions may be required. Typically, these busses are not available for monitoring or communications outside of what is provided through the OBD port. However, the present invention may authenticate to these local busses, such as the CAN and LIN busses, to "go below" the standard OBD protocol to obtain the necessary information about the vehicle, key, and communications between the vehicle and key.

Figure 23:
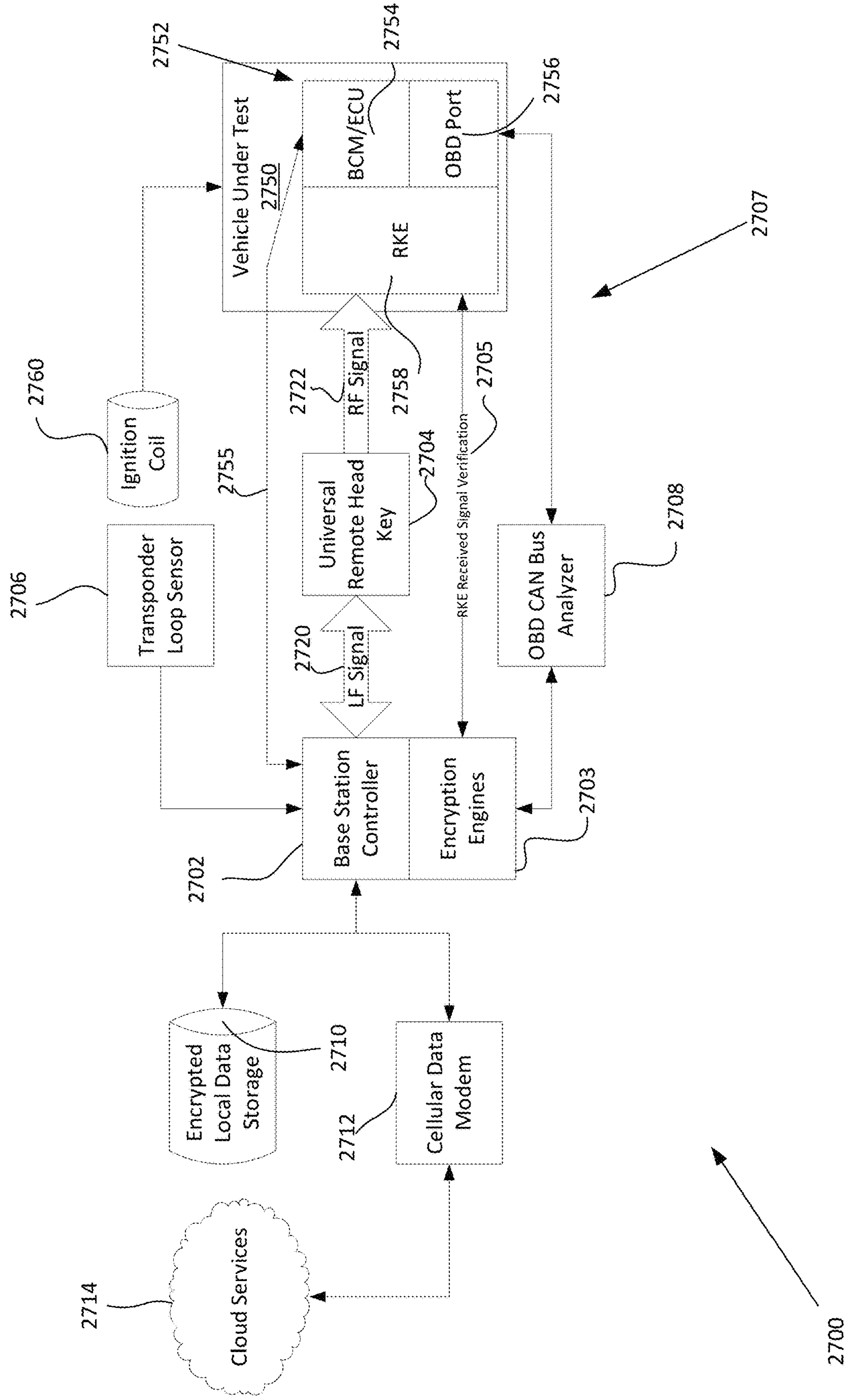
FIG. 23 provides a block-diagram schematic view of one embodiment of the system for capturing and storing pairing data when a key is paired with a vehicle.

With reference to FIG. 23, a block-diagram schematic view of one embodiment of a system 2700 for capturing and storing pairing data when a key is paired with a vehicle is provided. The system 2700 comprises a base station 2702 that may comprise or be connected to an ignition coil monitor or transponder loop sensor 2706 and an OBD port monitor 2708. Additionally, the base station controller 2702 comprises a set of encryption engines 2703 for encrypting/decrypting data in the encrypted local data storage 2710 and for encrypting/decrypting communications between the base station controller 2702, URHK 2704, and vehicle under test 2750. This may include extracting encrypted or encoded information from the BCM/ECU 2754 of the vehicle and also may include intercepting and interpreting communications over a plurality of communications pathways between the base station controller 2702, URHK 2704 and BCM/ECU 2754. The system 2700 further comprises an encrypted local data storage 2710, and is connected to local or wide area networks, such as cloud services 2714, or by a cellular data modem 2712. The cloud services 2714 may provide storage, processing support such as encryption and decryption, profiles, and updates for the base station controller 2702. In operation, the base station 2702 may monitor and capture information from the vehicle under test 2750 by the OBD port monitor 2708 and the transponder loop sensor 2706. These two communications pathways form part of a feedback loop. The system 2700 may be optimized using a feedback loop to send signals to the vehicle 2750 and key 2704 to see and interpret the behavior of one or both devices. This behavior and the communications signals may be interpreted by the base station controller 2702 and encrypted/decrypted by the encryption engines 2703 as necessary. These active signal paths 2707 include the signals between the OBD CAN bus analyzer 2708 and OBD port 2756, between the UHRK 2704 and RKE system 2758 (RF signal 2722 and RKE received signal verification 2705), and the transponder loop sensor 2706 and ignition coil 2760. These pathways may be uni- or bi-directional. The feedback pathway 2755 between the base station controller 2702 and the BCM/ECU 2754, for example, is bi-directional. Additionally, the LF signal pathway 2720, the RKE received signal verification pathway 2705, the communications between the encryption engines 2703 and OBD CAN bus analyzer 2708, the communications between the OBD CAN bus analyzer 2708 and the OBD port 2756, the communications between the cellular modem 2712 and both the cloud services 2714 and base station controller 2702, and the communications between the encrypted local data storage 2710 and base station controller 2702 may all be bi-directional. Uni-directional communications paths may include the RF signal 2722 from the URHK 2704 to the RKE 2758 of the vehicle 2750.

As in FIG. 18, in the system 2700 of FIG. 23 the transponder loop sensor 2706 is installed on the ignition coil 2760 of the vehicle under test 2750 and the OBD CAN bus analyzer 2708 is connected to the OBD port 2756 of the vehicle under test. The OBD port 2756 may be an OBD II port and the OBD port monitor 2708 may be adapted to connect to a standard OBD II connection port. The transponder loop sensor 2706 monitors communications and data that passes between the URHK 2704 and the ignition coil 2760. The transponder loop sensor 2706 may also be used to monitor communications when an OEM key is used. The OBD port monitor 2708 may gather information from vehicle electrical system components 2752 including the BCM/ECU 2754 and the RKE system 2758. The base station 2702 may also communicate directly with the URHK 2704 by a LF signal 2720 to send and/or receive data from the URHK 2704. This communication may include monitoring RF signals 2722 sent by the URHK 2704 to the vehicle under test 2750 RKE system 2758.

Additionally, with both the systems 2700 in FIGS. 23 and 2100 in FIG. 18 all transactions between the BCM/ECU and the base station controller may be logged. There may also be further communications from or between the BCM/ECU and a media system in the vehicle. In modern vehicles, the media system is typically integrated with some or all of the system security functions and some basic vehicle functions. This offloads functionality and actions typically performed or handled by the BCM/ECU. The base station controller, e.g., controller 2700, may log and/or intercept these communications in addition to communications to/from the BCM/ECU. The URHK 2704 (or URHK 2104) is also intelligent. The URHK 2704 may comprise one or more processors and one or more memories including RAM and ROM. The URHK 2704 may also be included in the data collection process and may log and collect data that is transferred between the URHK 2704 and the vehicle 2750.

Figure 19:
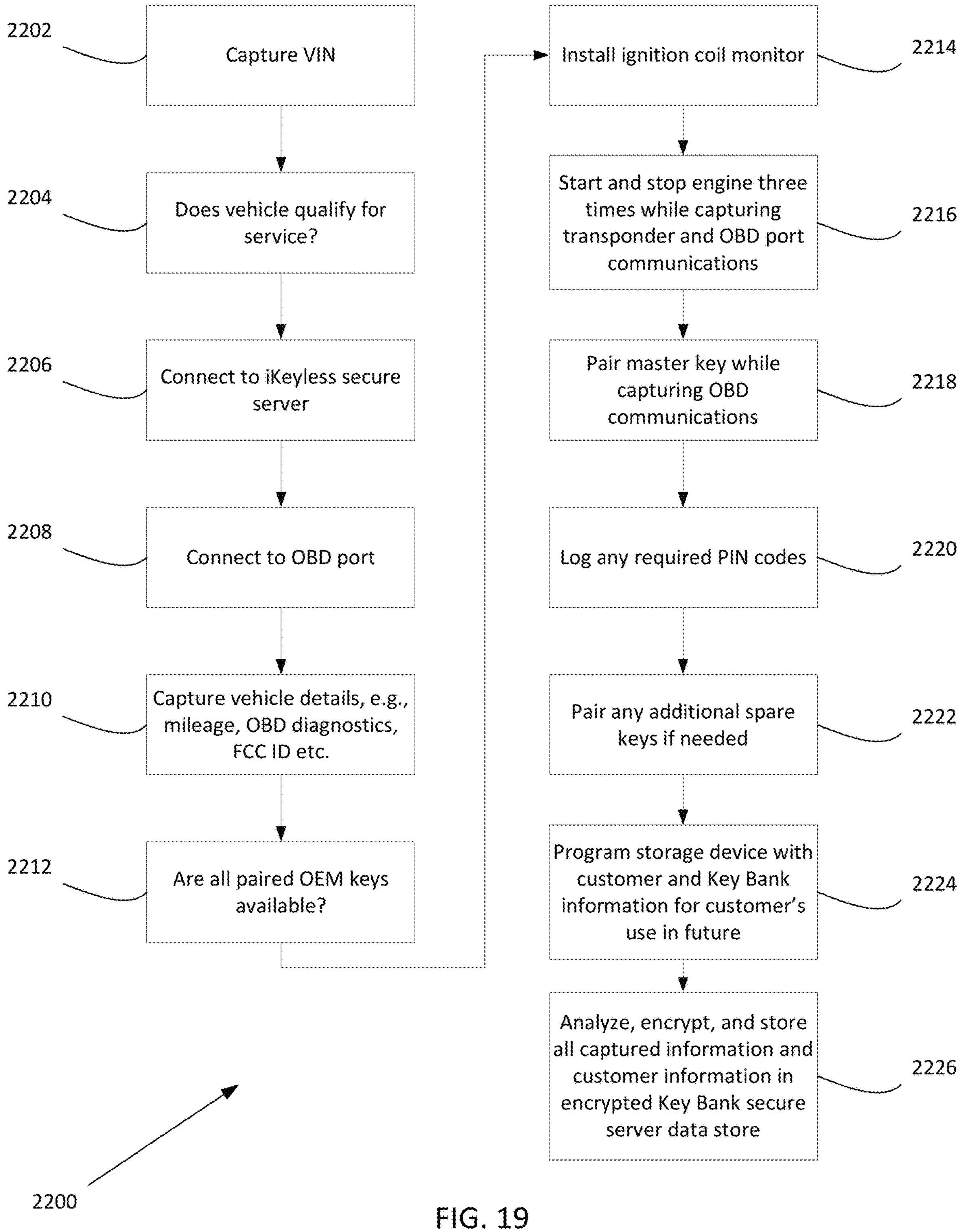
FIG. 19 provides a flowchart illustrating the general process of capturing vehicle data according to one embodiment of the invention.

With reference to FIG. 19, a flowchart 2200 illustrating the general process of capturing vehicle data for the Key Bank service according to one embodiment of the invention. The process begins with step 2202 where the VIN of a vehicle is captured by a device such as the base station 2102 or pairing data logger 2016. The VIN may be captured by taking a picture of the VIN barcode located on the vehicle, by taking a picture of the VIN itself, or by entering the VIN manually. The VIN is then evaluated at step 2204 to determine if the vehicle make and model are among the SKUs that may be used with the Key Bank service. If the vehicle is eligible, at step 2206 a connection is made to a secure server which may be operated by iKeyless, Inc.

After the connection is made with the secure server, at step 2208 a connection to a vehicle OBD port is made. Once the connection is made, at step 2210 vehicle data is captured. This vehicle data includes vehicle details and information such as mileage, OBD diagnostic information, Federal Communications Commission ("FCC") ID, BCM status and information, and other information that may be provided by the vehicle ECU. It is then determined at step 2212 if any or all of the vehicle OEM keys are available. If all keys are available, in particular any OEM master keys and other keys such as valet keys, then the process may continue. If the keys are not available, a URHK may be used to pair with the vehicle. An alternative method may be used to gather the necessary vehicle information, key information, and other unique information required to make a key backup for the Key Bank and Key Bank service if the OEM keys are not available.

If the vehicle OEM keys are available, at step 2214 an ignition coil monitor or transponder loop sensor is installed on the vehicle. The next step 2216 involves starting and stopping the engine three times while capturing transponder information at the ignition coil monitor and capturing OBD port communications and vehicle information at the OBD port monitor. The master key is then paired with the vehicle at step 2218 while capturing OBD port communications at the OBD port monitor. Any PIN codes or special codes required to complete the key pairing process are recorded and stored at step 2220. Any additional keys, spare keys, valet keys, or other keys may be paired at step 2222. At this time additional vehicle and key information may be captured.

After all information has been captured, a unique identification card or storage device, such as a radio frequency identification ("RFID") or NFC card, may be programmed or configured with customer information and with unique Key Bank information for the customer's use in the future at step 2224. The unique Key Bank information includes, for example, a unique identifier for the customer, vehicle information such as the VIN or SKU, and information about the number and type of keys enrolled in the Key Bank service.

The next step 2226 involves analyzing, encrypting and storing all captured information and customer information in the encrypted Key Bank secure server data store. The captured data including any captured datastreams from the ignition coil monitor and OBD port monitor are analyzed to identify and extract information necessary to create a replacement URHK. All information in the "conversation" between the vehicle and the key used in the process 2200 is captured and stored. The identified and extracted information may include transponder information, key information, and vehicle information necessary. All captured and analyzed information is associated with customer information and a unique identifier, e.g., a customer or vehicle owner identification number, and then encrypted and stored in an encrypted data store.

Figure 20:
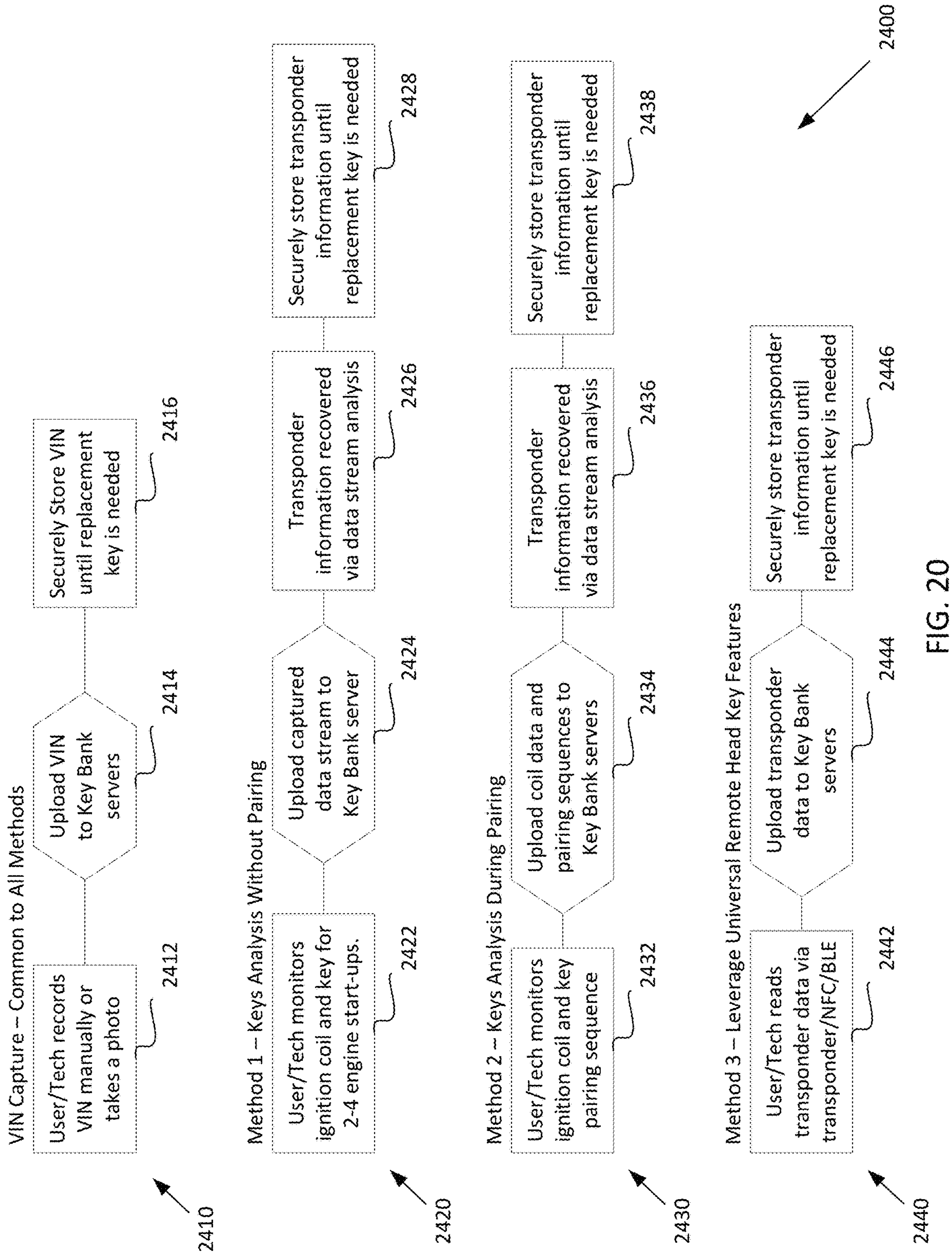
FIG. 20 provides a set of flowcharts illustrating methods that may be used to capture vehicle data according to the present invention.

With reference to FIG. 20, a set of flowcharts 2400 illustrating methods that may be used to capture vehicle data according to the present invention are provided. For any type of key enrollment and data capture for the Key Bank service, the VIN capture 2410 is performed. In the VIN capture 2410 process, a user or technician records the VIN manually or takes a picture of the VIN or VIN barcode on the vehicle at step 2412. In step 414, the VIN is securely uploaded or transmitted to the Key Bank servers. The VIN is then encrypted and securely stored at step 2416 until a replacement URHK is needed.

The method 2420 provides a method for key analysis without requiring the pairing of a master OEM key with the vehicle. First, in step 2422 a user or technician monitors the vehicle key, which may be an OEM key or a URHK, and the ignition coil through the use of an ignition coil monitor for 2-4 engine start-ups. The vehicle is started and stopped 2-4 times to capture all the necessary information about the key and vehicle, including transponder information. Next, in step 2424 the captured information data stream is uploaded or transmitted to the Key Bank server. The transponder information required to make a replacement key is identified and captured by analyzing the captured data stream in step 2426. The transponder information and captured data stream are stored securely in step 2428 in the Key Bank server encrypted data store as a set of unique data until a replacement key is required.

The method 2430 provides a method for key analysis during the pairing of an OEM key or URHK with the vehicle. First, in step 2432 a user or technician monitors the vehicle key, which may be an OEM key or a URHK, and the ignition coil through the use of an ignition coil monitor and monitors vehicle key pairing information through an OBD port monitor connected to a vehicle OBD port. The key is paired with the vehicle and the ignition coil monitor and OBD port monitor capture all information used, transmitted, and received during the pairing process. Next, in step 2434 the captured information data stream from the key, the ignition coil monitor and they OBD port is uploaded or transmitted to the Key Bank server. The transponder information required to make a replacement key is identified and captured by analyzing the captured data stream in step 2436. The transponder information and captured data stream are stored securely in step 2438 in the Key Bank server encrypted data store as a set of unique data until a replacement key is required.

The method 2440 provides a method for data capture using features unique to a URHK. The URHK may include features such as NFC and BTLE that enable communication directly with the URHK without requiring the use of ignition coil monitors or OBD port monitors. The URHK may be paired with a device such as a pairing data logger 2016, base station 2102, mobile device, personal computer, or OBD port communications device to transmit or capture the necessary data. A combination of these devices may be used to capture the data necessary to enroll a URHK vehicle key in the Key Bank service. In step 2422 the user or technician reads transponder data directly from the URHK by the URHK transponder, NFC connection, or BTLE connection. In step 2444 the data stream including transponder information is uploaded or transmitted to the Key Bank server. The transponder data is encrypted and securely stored in step 2446 in the Key Bank encrypted data store until a replacement key is needed.

Using any of the methods described in FIGS. 19 and 20. A unique set of data, customer data, vehicle data, and/or key data is stored in Key Bank servers, enrolling a user or customer's key in the Key Bank service. If the customer ever requires a replacement URHK, this information is used to generate, program and configure, and deliver a replacement key to the user. VIN and OBD port information are used to determine the type of transponder, the encryption protocol that is used, and the demodulation/modulation scheme that is required. The use of the wrong or incorrect secret key or encryption method will cause communications between the vehicle and key to fail.

Figure 21:
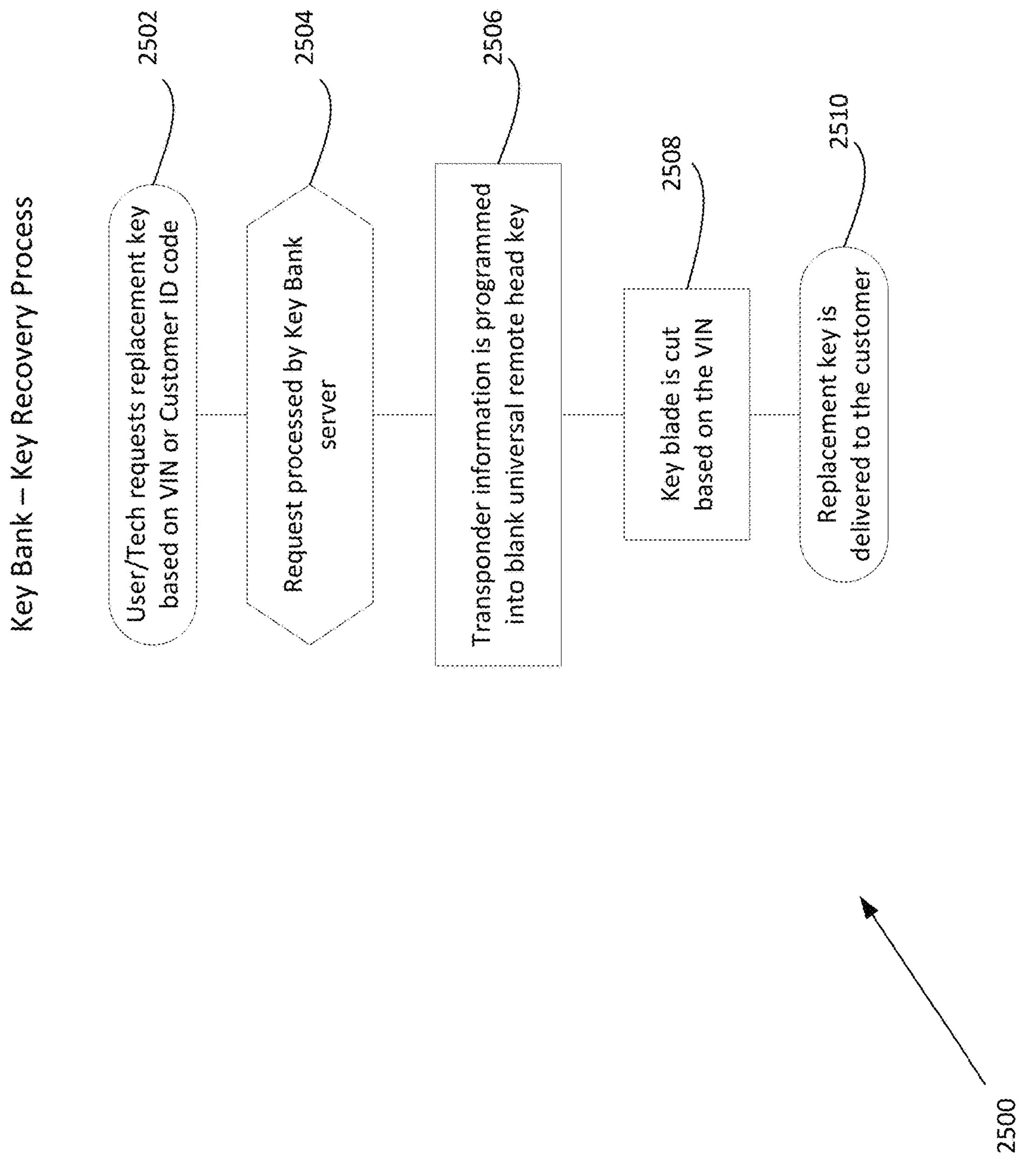
FIG. 21 provides a simplified flowchart of the process of producing a replacement vehicle key according to an embodiment of the present invention.

With reference to FIG. 21, a simplified flowchart 2500 of the process of producing a replacement vehicle key according to an embodiment of the present invention is provided. To produce a replacement vehicle key for a key enrolled in the Key Bank service, in step 2502 a user or technician first requests a replacement key be sent to them based on a VIN, customer ID code, or using a device to read a unique customer identification card such as an RFID card that has been programmed with the necessary identification information. The request is received and processed in step 2504 at the Key Bank server. The received information is verified and checked against the encrypted information stored in the Key Bank encrypted data store. Once verified, in step 2506 the unique information, including transponder information, is programmed into a blank URHK. The URHK is configured for the stored VIN, but additional functionality may also be programmed into the URHK based on user preferences. At step 2508 a key blade is cut based on stored key blade information that may be obtained based on the VIN. The configured URHK with cut key blade is then delivered to the customer at step 2510.

In another embodiment, after the key blade is cut in step 2508, or if only a keyfob or RKE device is needed and no key cutting is required, a non-paired keyfob/RKE device/transponder may be sent to the customer in step 2510. If a non-paired device is sent to the customer, the customer may be provided with a dongle-based programming tool so that the customer may easily pair the delivered product with the vehicle. Methods and systems for dongle-based key pairing and programming are described in U.S. Provisional Patent Application No. 62/690,326, entitled SYSTEM AND METHOD FOR PAIRING A KEY WITH A VEHICLE VIA A VEHICLE COMMUNICATIONS PORT BY A DONGLE, Johnson et al., filed Jun. 26, 2018, and in U.S. Provisional Patent Application No. 62/703,669, entitled SYSTEM AND METHOD FOR PAIRING A KEY WITH A VEHICLE VIA A VEHICLE COMMUNICATIONS PORT BY A DONGLE, Johnson et al., filed Jul. 26, 2018, both of which are incorporated herein by reference in their entirety.

With reference now to FIG. 22, a flowchart 2600 of the process of generating a replacement key and delivering the key to the customer according to an embodiment of the present invention is provided. The process for generating a replacement URHK begins at step 2602 when a customer service request is received. The customer service request includes customer identification information and vehicle identification information that are verified in step 2604. In step 2606 the key blade for the URHK is cut based on the vehicle VIN or based on stored key blade information. The URHK is then programmed in step 2608 based on the vehicle SKU and based on information stored in the Key Bank server from the enrollment process for the vehicle key. The programmed URHK may then be specifically configured to emulate a transponder in step 2610. In some configurations, the URHK may have a specific transponder in the URHK and may not need to emulate a key transponder. The memory in the URHK is updated with critical OEM key parameters such as rolling code information, key press information, and time information in step 2612. Then, in step 2614, any iKeyless URHK specific key features are programmed and enabled.

The URHK specific features are not available in a typical OEM key. The processing power of the system in the URHK and the memory of the URHK enable features that a standard vehicle head key or remote keyless entry system cannot provide. The additional features may include the ability to disable texting while driving on a paired mobile device; the ability to log driving times and locations using key, vehicle, and/or mobile device data; live GPS tracking; vehicle electrical system validation; engine service requirements and notifications; excessive speed, high engine RPM, and vehicle fault alerts; and the ability to disable the URHK from starting the vehicle on demand or based on a time schedule. Additionally, the URHK may be configured to provide for the upload of key and vehicle information to the Key Bank service and Key Bank servers as a backup system. These features may be dynamically uploaded to the URHK on a weekly/monthly basis as new features and services become available. The additional features may also be activated by a customer using a mobile device or application at a later time, or by a user or technician based on a subscription service. The URHK also enables a dealer or locksmith to select a desired vehicle or remote SKU via an application or specialized programming device and "bulk program" URHKs for use with a particular type, make, or model of vehicle. This feature may be especially useful for dealer or fleet vehicle key replacements.

In another embodiment, the vehicle data may be gathered by applying, temporarily to an original electronic key to be duplicated, an inductive reader for signals exchanged between a transponder of an original electronic key and a vehicle immobilizer control unit (e.g., BCM/ECU). The process may involve activating a vehicle instrument panel at least twice with the original electronic key connected to the inductive reader, to cause the inductive reader to acquire a first set of random numbers and a second set of random codes transmitted by the immobilizer control unit during the two activation steps of the vehicle instrument panel. After the random numbers and codes have been obtained, the inductive reader is connected to a transponder reader/writer to transfer all acquired data to the reader/writer, e.g., the base station controller. Then a non-readable code of the immobilizer control unit is determined by the reader/writer by using a function $f^{-1}$ inverse to that a function which creates a random code value from a unique vehicle identification number, a random number from the first set of random numbers, and the second set of random codes and by using the acquired data. After the non-readable code is determined, it is used to read from the original key, via the reader/writer, any other data memorized therein. Next a unique ID value is read selected from among the unique vehicle identification number, the first set of random numbers, and the second set of random code values from the original key, via said reader/writer, before, during or after any one of the preceding steps and then memorizing in a new key all data read from the original key.

The method uses a traditional transponder reader/writer provided with a display screen for displaying the operations to be carried out, a slot for inserting an original key to be read or a new key to be encoded, a seat for inserting an inductive reader and pushbuttons for controlling, in accordance with the operations displayed on the screen, the operations involved in reading from and writing to the key inserted into the slot in the reader/writer. The inductive reader comprises an electronic circuit housed in a parallelepiped casing, a pair of LEDs or other light and/or acoustic indicating means, and a wire antenna. The parallelepiped casing houses a microcontroller for controlling the entire operating cycle, a memory in which the data captured by the antenna can be stored, and an electric battery. The most significant data which intervene in a traditional process of mutual recognition between an electronic key and the control unit of a vehicle immobilizer includes: ID defines the identification number of the original key; SK defines the non-readable code of the original key and of the control unit; RND defines the random number generated by the immobilizer control unit when it recognizes the ID code of the key inserted into the vehicle ignition switch; SIG defines a function f calculated by a certain algorithm on the basis of the AD, SK and RND codes, i.e. SIG=f(ID, SK, RND); and RESPONSE defines the response of the recognized key, which after being recognized by the immobilizer control unit has itself recognized the control unit. The first operation consists of physically connecting the inductive reader temporarily in some manner to the original key, to maintain it coupled thereto during its use for at least two activation stages, i.e., when the key is inserted into the vehicle ignition switch. After two activation operations, which can take place during normal use of the original key, the inductive reader, which is present at the data exchange between said original key and the vehicle immobilizer control unit, receives and writes into its memory the ID code transmitted by the original key together with two numbers RND1 and RND2 and two codes SIG1 and SIG2 transmitted by the immobilizer control unit. For reasons of operational certainty, after the first acquisition the LED flashes, then after the second acquisition the LED remains continuously lit and the LED flashes to indicate completion of the acquisition stage. The inductive reader can then be separated from the original key and is connected to the transponder reader/writer, generally positioned in the shop or in the duplication center, and generally distant from the vehicle. Following this connection, which essentially involves the wire antenna of the inductive reader and the internal antenna of the reader/writer, the calculation process takes place therein, which from a knowledge of the ID, the two RDN1 and RDN2 values and the two SIG1 and SIG2 values, and using the inverse function f−1, enables the non-readable SK code of the control unit to be obtained, which is equal to that of the original key. When in possession of this SK value, the transponder reader/writer is able to write from the original key, previously inserted into its slot, all the data contained in its memory. After the original key has been removed from the slot of the reader/writer and the new key to be encoded inserted in its place, the transponder reader/writer is able to write into the memory of this latter all the data read from the original key. The sequence of the various operations involved in reading from the original key and writing to the new key can be executed as an automatic sequence or by stepwise control executed by operating the pushbuttons of the reader/writer. If the new key is to be encoded not only in its electronic characteristics but also in its mechanical characteristics, the mechanical notching can be carried out in traditional manner at any moment, before, during or after electronic encoding, as the two operations can be independent of each other. In particular, this mechanical notching is preferably carried out on termination of the electronic encoding, i.e., when the generally more critical operation has been successful. In order to prevent any previous memorizations in the inductive reader originating from previous duplication processes from being able to result in mistakes or uncertainties in the duplication operation underway, the inductive reader is preferably connected to the transponder reader/writer before each duplication, in order to be reset. Additional steps and elements are disclosed in U.S. Pat. No. 8,451,099, METHOD FOR DUPLICATING ELECTRONIC VEHICLE KEYS WITH MUTUAL AUTHENTICATION, Dondadini, issued May 28, 2013, which is incorporated by reference herein in its entirety.

In another embodiment, the present invention provides a method for the duplication of original electronic keys used in the automotive transports, and provided with coded and encrypted electronic authentication means, comprising: an Identification Code (ID), an encrypted secret code, a Password, an algorithm, data storage and computing means, able of being used in vehicles provided with a central processing unit able of storing an Identification Code (ID), an encrypted secret code, a Password, an algorithm, said duplication method being able of obtaining a duplicated key based on a blank key, which is originally provided with an algorithm, data storage means able of storing said Identification Code (ID), said secret code and said Password, wherein said data storage means are initially empty; said duplication is based on a duplication means and on a method which allows of using the blank key as intercepting means of secret codes sent by the vehicle central processing unit, and of transferring said information to the duplication means itself. The invention comprises a method of duplicating a motor vehicle electronic key, comprising: transmitting to the motor vehicle electronic key, by a first device, an encrypted secret code; receiving, by the motor vehicle electronic key, the encrypted secret code; as the electronic key is receiving the secret code which has been encrypted, intercepting the transmission to the motor vehicle electronic key by the first device, comprising the encrypted secret code, and storing, by a second device different from the first device and different from the motor vehicle electronic key, the encrypted secret code, which is extracted from the transmission; interrogating the motor vehicle electronic key, by a duplicator device which is different from the first device and different from the motor vehicle electronic key, using the encrypted secret code which has been intercepted and stored; receiving, by the duplicator device from the motor vehicle electronic key, a password transmitted from the motor vehicle electronic key in response to the interrogating; storing, by the duplicator device, the password transmitted from the motor vehicle electronic key; transmitting, by the duplicator device, the password to a blank key; and storing the password in the blank key. Additional steps and elements are disclosed in U.S. Pat. No. 8,750,510, entitled DUPLICATION MEANS FOR AN ELECTRONICALLY CODED KEY AND RELATED METHOD, Rebuli, issued Jun. 10, 2014, which is incorporated by reference herein in its entirety.

While the inventions of the URHK and Key Bank inventive aspects have been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A system for selectively programming a Radio Frequency (RF) remote access device comprising:

the programmable RF remote access device comprising a processor, a first memory preloaded with a plurality of device configuration profiles, a second memory comprising an active memory partition adapted to store an active firmware configuration, and a transmitter; and an external configuration device having a wireless configuration transmitter;

the external configuration device being adapted to:

select one or more of the plurality of device configuration profiles preloaded onto the programmable RF remote access device;

wirelessly transmit, by the wireless configuration transmitter, data identifying the one or more selected device configuration profiles to the programmable RF remote access device;

wherein the one or more selected device configuration profiles include information derived from one or more of the following vendor-specific properties: modulation schemes, binary encoding algorithms, data encoding techniques, packet payload templates, and algorithms configured to generate rolling codes to replicate the function of an original equipment manufacturer (OEM) keyless entry remote device;

the programmable RF remote access device processor being adapted to:

determine, based on the one or more selected device configuration profiles of the plurality of device configuration profiles that were preloaded in the first memory, a plurality of memory addresses in the first memory at which a plurality of encrypted sub-blocks of data are stored;

retrieve the encrypted sub-blocks of data from the first memory at respective memory addresses of the plurality of memory addresses;

decrypt each of the encrypted sub-blocks of data;

store the decrypted sub-blocks of data in the second memory; and generate an RF signal based on configuration information derived from the decrypted sub-blocks of data stored in the second memory; and the programmable RF remote access device transmitter being adapted to transmit the RF signal to an end device associated with the one or more selected device configuration profiles to cause the end device to perform a predefined operation.

2. The system of claim 1, wherein the end device is a vehicle and the one or more selected device configuration profiles comprises a set of OEM configurations for specific vehicle makes and models.

3. The system of claim 1, wherein the programmable RF remote access device further comprises an active learning configuration module.

4. The system of claim 1, wherein the programmable RF remote access device comprises a set of user interface elements adapted to receive a manual input.

5. The system of claim 1, wherein the programmable RF remote access device receives the data identifying the one or more selected device configuration profiles by communication means selected from: a radio frequency communication, an inductive link communication, an infra-red communication, a visible light communication, an ultra-sonic communication, Bluetooth communication, and 802.11 wireless communication.

6. The system of claim 1, wherein the programmable RF remote access device further comprises an encryption module, and the processor is further adapted to: retrieve an encryption code from the encryption module, the encryption code associated with the one or more selected device configuration profiles; and generate the RF signal based on the one or more selected device configuration profiles and the encryption code.

7. The system of claim 6, wherein the encryption code is a rolling code.

8. The system of claim 1, wherein the wireless configuration transmitter is adapted to transmit the data identifying the one or more selected device configuration profiles to the programmable RF remote access device by a second RF signal by communication means selected from: a radio frequency communication, an inductive link communication, an infra-red communication, a visible light communication, an ultra-sonic communication, Bluetooth communication, and 802.11 wireless communication.

9. The system of claim 1, wherein the programmable RF remote access device further comprises a power state controller adapted to set a power state of the programmable RF remote access device automatically based on a first detected voltage, an encryption module for encrypting the one or more selected device configuration profiles, or a location determination means.

10. The system of claim 1, wherein the end device is a vehicle and the RF signal causes the vehicle to perform one or more of a locking/unlocking function, an engine ignition enable function, a trunk opening function, a remote device recognition, and an alarm function.

11. The system of claim 1, wherein the one or more selected device configuration profiles includes a first configuration profile associated with a first vehicle and a second configuration profile associated with a second vehicle, the programmable RF remote access device adapted to be configured to generate and transmit a first RF signal to cause the first vehicle to perform a predefined operation and to generate and transmit a second RF signal to cause the second vehicle to perform a predefined operation, the first RF signal being different that the second RF signal.

12. A method of selectively programming a Radio Frequency (RF) remote access device comprising a processor, a first memory, a second memory comprising an active memory partition adapted to store an active firmware configuration, and a transmitter, the method comprising:

wirelessly receiving, by the RF remote access device from an external configuration device via a wireless configuration transmitter, data identifying one or more selected device configuration profiles, wherein the one or more selected device configuration profiles were selected via user engagement with one or more user interface elements on the external configuration device;

determining, based on the one or more selected device configuration profiles of the plurality of device configuration profiles, a plurality of memory addresses in the first memory at which a plurality of encrypted sub-blocks of data are stored, wherein the encrypted sub-blocks of data correspond to the one or more selected device configuration profiles;

selecting and retrieving, by the RF remote access device from the first memory using respective memory addresses of the plurality of memory addresses, preloaded encrypted sub-blocks corresponding to the one or more selected device configuration profiles;

wherein the one or more selected device configuration profiles include information derived from one or more of the following vendor-specific properties: modulation schemes, binary encoding algorithms, data encoding techniques, packet payload templates, and algorithms configured to generate rolling codes to replicate the function of an original equipment manufacturer (OEM) keyless entry remote device;

decrypting each of the retrieved encrypted sub-blocks of data;

storing the decrypted sub-blocks of data in the second memory;

accessing, by the RF remote access device processor from the second memory, the decrypted sub-blocks of data corresponding to the one or more selected device configuration profiles and generating an RF signal based on the one or more selected device configuration profiles; and transmitting, by the RF remote access device transmitter, the RF signal to an end device associated with the one or more selected device configuration profiles to cause the end device to perform a predefined operation.

13. The method of claim 12, wherein the end device is a vehicle and the one or more selected device configuration profiles comprises a set of OEM configurations for specific vehicle makes and models.

14. The method of claim 12 further comprising receiving, at a set of user interface elements associated with the RF remote access device, a manual input.

15. The method of claim 12, wherein the data identifying the one or more selected device configuration profiles is received by the RF remote access device by communication means selected from: a radio frequency communication, an inductive link communication, an infra-red communication, a visible light communication, and an ultra-sonic communication.

16. The method of claim 12, wherein the RF remote access device further comprises an encryption module, and further comprising retrieving an encryption code from the encryption module, the encryption code associated with the one or more selected device configuration profiles; and generating the RF signal based on the one or more selected device configuration profiles and the encryption code.

17. The method of claim 16, wherein the encryption code is a rolling code.

18. The method of claim 12, wherein the RF remote access device further comprises a power state controller, and automatically setting a power state of the RF remote access device based on a first detected voltage, an encryption module for encrypting the one or more selected device configuration profiles, or a location determination means.

19. The method of claim 12, wherein the end device is a vehicle and the RF signal causes the vehicle to perform one or more of a locking/unlocking function, an engine ignition enable function, a trunk opening function, a remote device recognition, and an alarm function.

20. The method of claim 12, wherein the one or more selected device configuration profiles includes a first configuration profile associated with a first vehicle and a second configuration profile associated with a second vehicle, and further comprising generating and transmitting by the RF remote access device a first RF signal to cause the first vehicle to perform a predefined operation and to generate and transmit a second RF signal to cause the second vehicle to perform a predefined operation, the first RF signal being different that the second RF signal.

* * * * *